United States Patent
Parulski et al.

(10) Patent No.: US 7,859,588 B2
(45) Date of Patent: *Dec. 28, 2010

(54) METHOD AND APPARATUS FOR OPERATING A DUAL LENS CAMERA TO AUGMENT AN IMAGE

(75) Inventors: Kenneth A. Parulski, Rochester, NY (US); Wilbert F. Janson, Jr., Shortsville, NY (US); John N. Border, Walworth, NY (US); John R. Fredlund, Rochester, NY (US); Joseph A. Manico, Rochester, NY (US); Robert J. Parada, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/684,025

(22) Filed: Mar. 9, 2007

(65) Prior Publication Data

US 2008/0218611 A1    Sep. 11, 2008

(51) Int. Cl.
*H04N 5/232* (2006.01)
*G03B 13/00* (2006.01)
*G03B 17/00* (2006.01)

(52) U.S. Cl. ........................ 348/349; 396/79
(58) Field of Classification Search ................ 348/349; 396/72, 79, 100
See application file for complete search history.

(56) References Cited

U.S. PATENT DOCUMENTS

| | | | |
|---|---|---|---|
| 4,606,630 A | 8/1986 | Haruki et al. | |
| 5,668,597 A | 9/1997 | Parulski et al. | |
| 5,874,994 A | 2/1999 | Xie et al. | |
| 6,441,855 B1 | 8/2002 | Omata et al. | |
| 6,611,289 B1 | 8/2003 | Yu et al. | |
| 6,864,474 B2 | 3/2005 | Misawa | |
| 7,676,146 B2 * | 3/2010 | Border et al. | 396/80 |
| 2003/0020814 A1 | 1/2003 | Ono | |
| 2003/0160886 A1 | 8/2003 | Misawa et al. | |
| 2005/0046738 A1 | 3/2005 | Sato | |
| 2005/0275747 A1 | 12/2005 | Nayar et al. | |
| 2006/0187312 A1 | 8/2006 | Labaziewicz et al. | |

(Continued)

FOREIGN PATENT DOCUMENTS

EP    0 858 208    8/1998

(Continued)

*Primary Examiner*—Kelly L Jerabek
(74) *Attorney, Agent, or Firm*—Thomas J. Strouse; Peyton C. Watkins

(57) ABSTRACT

An electronic camera for producing an output image of a scene from a captured image signal includes a first imaging stage comprising a first image sensor for generating a first sensor output and a first lens for forming a first image of the scene on the first image sensor, and a second imaging stage comprising a second image sensor for generating a second sensor output and a second lens for forming a second image of the scene on the second image sensor. The sensor output from the first imaging stage is used as a primary output image for forming the captured image signal and the sensor output from the second imaging stage is used as a secondary output image for modifying the primary output image, thereby generating an enhanced, captured image signal.

22 Claims, 29 Drawing Sheets

U.S. PATENT DOCUMENTS

| | | |
|---|---|---|
| 2006/0193509 A1 | 8/2006 | Criminisi et al. |
| 2008/0013941 A1* | 1/2008 | Daley .................. 396/121 |
| 2008/0218612 A1* | 9/2008 | Border et al. ........... 348/262 |
| 2008/0218613 A1* | 9/2008 | Janson et al. ........... 348/262 |

FOREIGN PATENT DOCUMENTS

| | | |
|---|---|---|
| JP | 2005045511 | 2/2005 |
| WO | 01/06449 | 1/2001 |
| WO | 2005/057278 | 6/2005 |

* cited by examiner

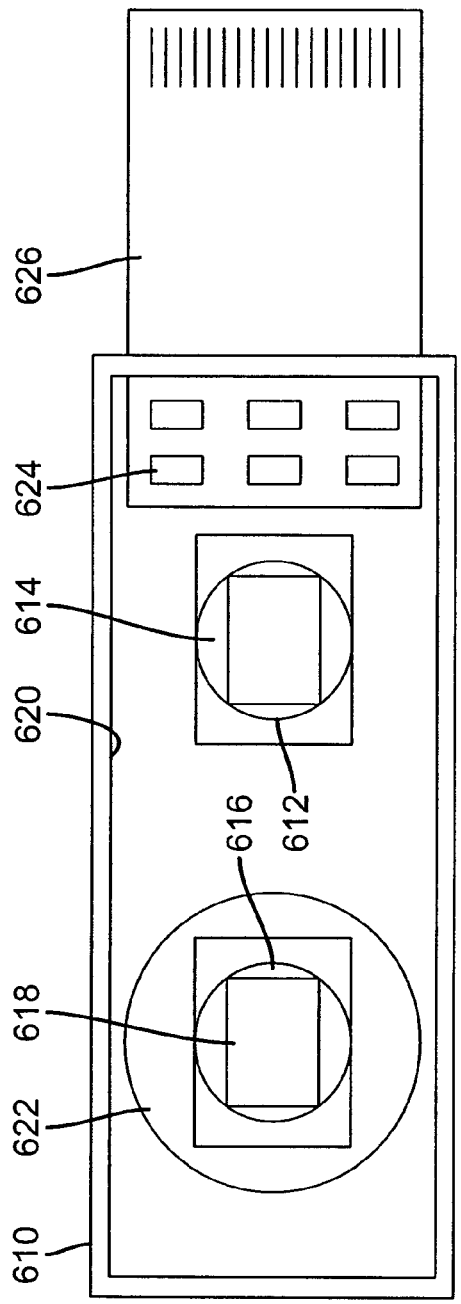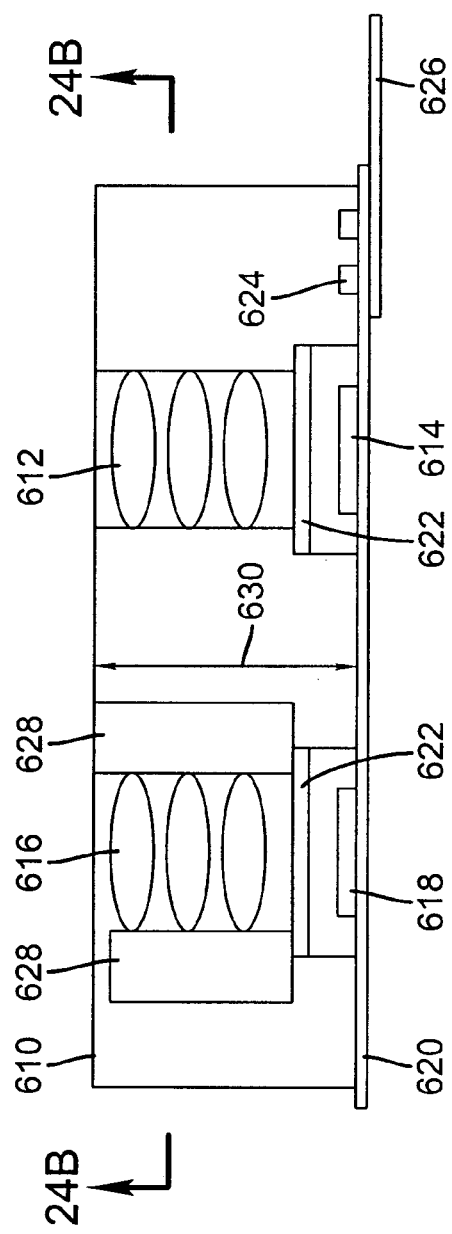
FIG. 16A
FIG. 16B

METHOD AND APPARATUS FOR OPERATING A DUAL LENS CAMERA TO AUGMENT AN IMAGE

FIELD OF THE INVENTION

The present invention relates to a digital camera that produces digital image files and, more particularly, to a digital camera that uses multiple lenses and image sensors to provide an improved imaging capability.

BACKGROUND OF THE INVENTION

Currently, most digital cameras use a zoom taking lens and a single color image sensor to capture still and motion images. The captured images are then processed to produce digital image files, which are stored in a digital memory in the camera. The digital image files can then be transferred to a computer, displayed, printed, and shared via the Internet.

In order to capture sharp images of moving subjects, a digital camera needs to provide a precise automatic lens focusing system (i.e., an autofocus system). The autofocus system must be capable of quickly obtaining the correct focus in order to minimize the "shutter delay" between the time the shutter button is pressed and the still image is captured. The autofocus system must also work in a continuous image capture mode wherein video images are captured. For instance, in a video mode the focus should be adjusted in real-time while video images are being continuously captured.

Many digital cameras and scanners capture images using an image sensor and a taking lens system with an adjustable focus. Typically, the focus distance of such an adjustable focus taking lens system can automatically be set to one of a plurality of different settings by sensing, control, and drive systems, which are adapted to provide optimal focus of what is determined to be a subject area in a scene. Lens systems that provide automatically adjustable focus settings based on a focus measurement and an adjustable focus lens are referred to herein as autofocus systems. Digital cameras typically use one of two types of autofocus systems: a rangefinder system and a "through-the-lens" focus system.

A rangefinder system uses rangefinding sensors such as a sonic rangefinder or a dual lens rangefinder to determine the distance from a camera to one or more portions of a scene within a field of view of the rangefinder system. A sonic rangefinder measures the phase offset between a projected sonic signal and a reflected sonic signal to infer the distance to objects in the scene. Dual lens rangefinders contain two lenses that are separated by a distance along with two matching sensor areas that capture matched pairs of images. Dual lens rangefinders are commonly used on digital cameras in the form of dual lens rangefinder modules which contain two lenses separated by a distance along with two matching sensor areas that capture matched pairs of low resolution images.

Common dual lens rangefinder-based autofocus systems include active and passive systems. Active systems actively project light onto the scene, while passive systems work with the available light from the scene. Dual lens rangefinder modules can be purchased from Fuji Electric in several models such as the FM6260W. A dual lens rangefinder module for optical apparatus such as a camera is described in U.S. Pat. No. 4,606,630, which was issued to Haruki et al. on Aug. 19, 1986 (and assigned to Fuji Electric). According to the description of the prior art in this patent, matched pairs of low resolution images are analyzed for correlation between the two images to determine the offset between the two images caused by the separation between the two lenses.

A diagram illustrative of the principle of the operation of a conventional rangefinder is shown herein in FIG. 27. In that diagram, light from an object 151 is incident on two small lenses 152 and 153 which have a sufficiently short focal length f that light rays received from the object through different spaced paths 154 and 155 produce corresponding spaced images 157 and 158 in a focal plane 156 which is common to the lenses 152 and 153. When the object 151 is at an infinite distance, the centers of the images 157 and 158 are located at reference positions 170 and 180 in FIG. 27, but when the object 151 is located at a closer distance, the centers of the images are shifted apart to positions 171 and 181. If the distance by which the images 157 and 158 are shifted from the reference positions 170 and 180 are designated $x_1$ and $x_2$, respectively, then the total shift x may be expressed as follows:

$$x = x_1 + x_2 = b \cdot f/d$$

Thus, the distance d to the object 151 can be measured by $d = b \cdot f/x$. In this case, b is the distance between the optical axes of the small lenses, that is, the base length. To obtain the shifted amounts $x_1$ and $x_2$, or the sum x of both, two optical sensor arrays 190 and 191 are provided in the focal plane 156 as shown in FIG. 27. These optical sensor arrays each comprise a plurality of optical sensors, for instance CCD devices, and an analog photoelectric signal is generated by each optical sensor corresponding to the light intensity at the portion of the image which is incident on the sensor. Haruki et al. shows a conventional circuit, as well as a higher speed rangefinding circuit according to the patent, for obtaining the sum x of the shifted distances by comparing two image signal trains comprising the digital image signals from the left and right optical sensor arrays.

Basically, the offset information x is used along with the lens separation distance b and the focal length f to calculate the distanced to the scene by triangulation. The calculated distance d to the scene is used to guide the positioning of an adjustable focus lens to produce the best image quality. As known in the prior art, this adjustment may be based on a calibration curve established between the distance to the scene as measured by the dual lens rangefinder module and a series of best focused images as produced by a "through the lens" autofocus system. The calibration curve is stored as an equation or a look-up table in a microprocessor in the camera.

Rangefinder-based autofocus systems have the advantage of being very fast, some having a response time that can be in the range of 0.01-0.05 second. However, the focus quality produced by some rangefinder-based autofocus systems can vary when they are used in different operating conditions. For example, sonic autofocus systems cannot focus through a glass window as the glass stops the projected sonic signal, thereby causing the autofocus system to focus onto the glass. In the case of a dual lens rangefinder autofocus system, the accuracy of dual lens rangefinders are typically influenced by changes in environmental conditions such as temperature and/or humidity. The problem with dual lens rangefinder modules is that the calibration between the dual lens rangefinder module and the adjustable focus lens position is not stable within the normal operating environment for digital cameras. Environmental conditions such as changes in temperature and humidity can cause the distance to the portion of the scene as measured by the dual lens rangefinder module to change by over 10%. In addition, the measured position of the adjustable focus taking lens in the adjustable focus taking lens system is prone to environmentally induced changes as well so that inaccuracies are produced in the control system for the adjustable focus lens. Consequently, dual lens rangefinder modules are not typically used independently for autofocus in digital cameras but instead are used as a rough focus adjustment that is supplemented by a "through the lens" autofocus system.

Alternatively, the "through-the-lens" autofocus system determines a focus state through an analysis of a series of autofocus images captured with the adjustable focus lens system positioned at a plurality of different focus distances. For example, in a typical "through-the-lens" autofocus system a plurality of autofocus images (e.g., 5-20) are captured with the adjustable focus lens in a series of different positions in a so-called "hill climb" method. This type of autofocus is known as "hill climbing" autofocus because it generates a sequence of values that increase in level until they pass over a peak, i.e., a "hill". In other words, the lens focus position is adjusted automatically until the contrast of the edge detail in the image, or a particular area of the image, is maximized. For instance, the contrast present in each of the autofocus images is compared and the autofocus image with the greatest contrast is deemed to have been captured with the best focus conditions (often the best focus lens position is further refined by interpolating the contrast values between images).

In order to decrease focusing response time without sacrificing focusing precision, it is common to use filters to separate not only the higher frequency component of the video signal, but also the lower frequency component. For example, a lens may be quickly driven in coarse adjustment steps in a low frequency range furthest from the maximum focus, and then driven in finer adjustment steps in a high frequency range nearer to the maximum focus. A flow diagram of a conventional "hill climbing" contrast autofocus algorithm is shown in FIG. 28. This algorithm uses the "hill climbing" contrast autofocus method discussed above and shown in the diagram of FIG. 29, which illustrates the relationship between the focus value obtained from the filters and the lens position. In FIG. 29, the abscissa indicates the focusing position of a lens along a distance axis, the ordinate indicates the focusing evaluation value, and the curves A and B indicate the focusing evaluation values for high and low frequency components, respectively, relative to a particular in-focus position P.

Referring to the flow diagram of FIG. 28, the best starting point for the algorithm depends on the hyperfocal distance of the current lens setting, which is a function of the focal length setting and the f-number. A distance of about 2 meters is typically a good starting point. Then a low frequency bandpass filter is loaded (stage 197) and the focus values are read out. The algorithm employs a comparison stage 198 to set the direction of lens adjustment toward increasing focus values, and to determine when the lens is stepped over the "hill". The depth of field, which depends on the present focal length and f-number, sets the number of steps, i.e., the next near focus position, which should be taken before capturing the next frame when using the low frequency bandpass filter. Once the peak of the hill is passed (curve B in FIG. 29), a high frequency bandpass filter is loaded (stage 199), and the lens is moved in the opposite direction until the peak of the higher "hill" is found (curve A in FIG. 29). The peak focus value may use either the weighted average or peak value from numerous pixels.

"Through-the-lens" autofocus systems are very accurate since they measure focus quality directly from autofocus images captured with the high quality taking lens. Unfortunately, "through-the-lens" autofocus systems can be relatively slow in determining a focus setting due to the large number of autofocus images that must be captured and compared. For example, "through-the-lens" autofocus systems can take as long as 0.5-2.0 seconds to determine focus conditions.

Accordingly, in some digital cameras, the two types of autofocus systems are used together in a hybrid system in which the rangefinder based autofocus system is used to provide a fast estimation of the adjustable focus lens location that is then followed by the use of the "through-the-lens" autofocus system to refine the focus setting. For example, U.S. Pat. No. 6,864,474, entitled "Focusing Apparatus for Adjusting Focus of an Optical Instrument" and which issued Mar. 8, 2005 in the name of Misawa, describes the coordinated use of a rangefinder-based autofocus system with a "through-the-lens" autofocus system. In Misawa, the focus position of the adjustable focus taking lens is determined by both the rangefinder-based autofocus system and the "through-the-lens" autofocus system. The difference between the adjustable focus taking lens position determined by the rangefinder-based autofocus system and the adjustable focus taking lens position determined by the "through-the-lens" autofocus system is stored for future reference. In subsequent image capture episodes, the stored difference information is used to refine the number of autofocus images captured and analyzed by the "through-the-lens" autofocus system in the "hill climb" method to determine the adjustable focus lens position for best focus, thereby reducing the number of autofocus images captured and processed in cases where the rangefinder system is accurate and increasing the number of autofocus images captured and processed in cases where the rangefinder is inaccurate. However, the method described by Misawa assumes that the performance of the rangefinder, adjustable focus taking lens system and control system are consistent over time, do not fluctuate with variations in environmental conditions, and do not otherwise change or drift over time.

Once an image is in focus, the "hill climb" method typically operates over incremental distances near the subject presently focused upon. Then, in refocusing an image, the "hill climb" method typically determines whether any lens movement is stepping "up or down the hill" and resets the lens for a new maximum. In practice, this means that, if the lens movement is stepping "down the hill", the lens motion is immediately reversed so as to seek the new maximum for the existing subject. This is a particular problem in video focusing, where a new subject at some distance away from the present subject may come into the image and never be detected by the "hill climb" method—even where the new subject may present a greater "hill" in terms of contrast values. One way of responding to this problem is referred to as "whole way" autofocusing, where the auto focus module looks over all the distances discernible by the taking lens before deciding upon a focus position.

Commonly assigned U.S. Pat. No. 6,441,855 describes a "whole-way" autofocusing method, where a focusing device includes a movable focusing lens adapted to be moved to different positions across the entire focusing range, a conversion element for converting light incident on and transmitted through the focusing lens into a signal, and a lens driving mechanism for moving the focusing lens. The focusing device further includes a focus evaluation value calculation unit for calculating a focus evaluation value for each position of the focusing lens based on the signal from the conversion element. The focus evaluation value calculation unit extracts only the signals corresponding to the pixels in a focus area defined, e.g., at the center of an image, which is further divided into nine "tiles", that is, blocks that are obtained by dividing the focus area into a small number of rows and columns used as observation areas.

In calculating the focus evaluation values, a determination is first made as to whether or not the calculation of the focus evaluation values has been repeated a certain number of times, e.g., ten times, for different distance settings. When the determination is negative, the focusing lens is moved by a preset step width, and the calculation is repeated. Thus, the focusing lens is always moved stepwise from an infinite far position to a nearest position, and for each step of movement, a focus evaluation value is calculated for each tile. These calculations are performed for the respective tiles, to thereby obtain the focus evaluation values for ten lens positions for each of the nine tiles, including all of the peaks that are found across the total distance. Using the ten total sums obtained for the respective lens positions as the focus evaluation values, the focusing lens position producing the maximum peak is determined as the in-focus lens position. A lens driving output is then applied to the lens driving mechanism so that the lens moves to the determined in-focus position.

In order to provide a small size digital camera with a large "optical zoom range", a digital camera can use multiple image sensors with different focal length lenses, as described in commonly assigned U.S. patent application Ser. No. 11/062,174, entitled "Digital Camera Using Multiple Lenses and Image Sensors to Provide an Improved Zoom Range", which was filed Feb. 18, 2005 in the names of Labaziewicz et al., the disclosure of which is incorporated herein by reference. For example, the Kodak Easyshare V610 dual lens digital camera includes a 38-114 mm (35 mm equiv.) f/3.9-f/4.4 lens and a 130-380 mm (35 mm equiv.) f/4.8 lens, in order to provide a 10× optical zoom range. However, in both this patent application and product, only one of the two image sensors is used at a time. The two image sensors do not simultaneously capture images.

U.S. Patent Application Publication No. US 2003/0020814, which was published Jan. 30, 2003, discloses an image capturing apparatus having a plurality of capturing optical systems, each coupled to a CCD image sensor, including a first system having a shorter focal length and a second system having a longer focal length. In the various embodiments described in this disclosure, the two lenses can provide different focal lengths ranges, including one system with a fixed-focus lens and the other system with a zoom lens, or they can both be fixed focus lenses set to two different focus distance settings. In each case, rather than obtaining user input, a selection unit automatically selects the capture signals from one of the capturing optical systems based on capture conditions, such as measured distance or luminance, determined by a capture condition acquiring unit. The autofocus for these systems is provided using a separate distance sensor. Neither of the two CCD image sensors are used for the autofocusing operation.

U.S. Patent Application Publication No. US 2003/0160886, which was published Aug. 23, 2003, discloses a digital camera having two photographing systems that are independent of each other. One embodiment shows one system including a monofocal "ordinary mode" lens and the other system including a zoom "telescopic mode" lens, each generating an image. An operator-actuated change over switch determines which image is to be recorded. Autofocus is also disclosed in connection with the separate photographing systems, where a "hill-climb" contrast comparison technique used in one system complements a "hill-climb" contrast comparison technique used in the other system. When it is desired to capture an image from the telescopic mode optical system, a rough autofocus search (where a stepping motor may be driven at intervals of several steps) is made by the ordinary mode optical system (where the focal depth is relatively large). This rough search results in a reduced focal distance range that includes the focusing position. Using the focal distance range information provided by the ordinary mode optical system, the telescopic mode optical system is driven to an autofocus search start position at one end of the reduced focal distance range. Then, a fine autofocus search is performed by the telescopic mode optical system (where the focal depth is relatively shorter), but only in the reduced focal distance range determined by the ordinary mode autofocus search. (When it is desired to capture an image from the ordinary mode optical system, the autofocus search is made solely by the ordinary mode optical system, with the telescopic mode optical system playing no part in the autofocus search.)

In another embodiment in U.S. Patent Application Publication No. US 2003/0160886, which does not depend on the rough vs. fine search mentioned above, a "hill climb" contrast comparison search is performed while the focusing lens of a first optical system is driven stepwise so as to move from an infinite distance setting toward a closest distance position, and a second "hill climb" contrast comparison search is performed while the focusing lens of a second optical system is driven stepwise from the closest position toward the infinite setting. This procedure continues until a maximum contrast position is located, although neither system ordinarily needs to move through its entire range. This tends to reduce the time period for detecting a focusing position. In this embodiment, each of the optical systems could be used for capturing an image and for focus adjustment, or one optical system could be employed for capturing an image and focus adjustment and the other optical system could be devoted only to focus adjustment of the image-capturing optical system. In another embodiment, in the case where the non-capturing optical system determines the focusing position first, the capturing optical system is driven to that position and a fine adjustment is then made by the capturing optical system.

A problem with these prior art systems is that either a separate autofocus sensor must be used (thus increasing the cost) or else there is typically a significant "shutter delay" as the autofocus is performed using the same sensor that is used to capture the image. Moreover, the separate autofocus sensor is usually a rangefinder and, as mentioned above, the calibration between the dual lens rangefinder module and the adjustable focus lens position is not stable within the normal operating environment for digital cameras. Where the autofocus is performed with the "through-the-lens" taking system, the process can be relatively slow in determining a focus setting due to the large number of autofocus images that must be captured and compared. The problem can be somewhat alleviated according to the aforementioned U.S. Patent Application Publication No. US 2003/0160886, but difficulties remain in rapidly achieving focus as the subject changes or moves, or in rapidly interchanging the focusing requirements of the optical systems when the operator elects to change the capture function from one photographing system to the other.

A special problem arises during video capture, where the autofocus images are derived from the same series of still images or frames that compose the video images. Consequently, the process of autofocusing may cause 5-20 or more out of focus video images to be produced in the video each time the scene changes. As a result, during video capture with pan movements of the camera where the scene changes continuously, large portions of the video are actually out of focus as the autofocus system hunts for proper focus. A further problem is that during video capture, many of the frames are out of focus due to the use of an autofocus system that uses the "hill climb method" to focus.

In copending, commonly-assigned U.S. patent application Ser. No. 11/684,025, entitled "Camera Using Multiple Lenses and Image Sensors to Provide Improved Focusing Capability" and filed on even date herewith in the names of John Border et al., the aforementioned problems are addressed in a multi-lens digital camera in which two (or more) image capture stages are used to separately capture images of the same scene so that one image capture stage can be used for autofocus while the other(s) is used for capturing a still image or a video. This provides precise, rapid autofocus in both still and video modes without unduly increasing the size or cost of the digital camera.

Besides the autofocus advantages, such a camera provides two separate image capture stages yielding separate high resolution images of basically the same scene, or the same portion(s) of the same scene. This offers a number of possibilities for using one of the images to modify or otherwise augment the other image. What is therefore needed is a digital camera with dual capture systems that provides an improved imaging capability by utilizing both images to provide an improved output image.

SUMMARY OF THE INVENTION

The object of this invention is to provide an improved imaging capability in a multi-lens digital camera utilizing both (or more) images to provide an improved output image. without unduly increasing the size or cost of the camera.

A further object of the invention is to utilize one of the images from a dual-lens camera as a secondary image that can be used to modify the other, primary image and thereby generate an enhanced primary image.

The present invention, which is directed to overcoming one or more of the problems set forth above, pertains to an electronic camera for producing an output image of a scene from a captured image signal. Briefly summarized, the invention comprises, according to a first embodiment of the invention:

a first imaging stage comprising a first image sensor for generating a first sensor output and a first lens for forming a first image of the scene on the first image sensor;

a second imaging stage comprising a second image sensor for generating a second sensor output and a second lens for forming a second image of the scene on the second image sensor; and a processing stage for using the sensor output from the first imaging stage as a primary output image for forming the captured image signal and using the sensor output from the second imaging stage as a secondary output image for modifying the primary output image, thereby generating an enhanced, captured image signal.

The secondary output image may be used by the processing stage for a number of purposes, including without limitation: to sharpen portions of the primary image (e.g., to extend the depth of field of the primary still image or to selectively sharpen portions of the primary still image and defocus other portions of the image, particularly where the secondary output image is captured by the second imaging stage at a different focus position than used by the first imaging stage to capture the primary output image); to modify the dynamic range of the primary image (e.g., where the secondary output image is captured by the second imaging stage at a different exposure level than used by the first imaging stage to capture the primary output image); to provide scene analysis data for setting the capture parameters for the primary image; or to replace portions of the primary image (areas of lower noise but with some motion blur) with corresponding portions of the secondary image (areas of higher noise but little or no motion blur) to obtain a modified image with relatively low noise and good sharpness.

Briefly summarized, the invention generally comprises the use of two (or more) image capture stages, wherein an image capture stage is composed of a sensor, a lens and a lens focus adjuster, in a multi-lens digital camera in which the two (or more) image capture stages can be used to separately capture images of the same scene so that one image capture stage can be used for autofocus and other purposes while the other(s) is used for capturing an image. In thus utilizing the invention, a digital camera advantageously provides an improved imaging capability without unduly increasing the size or cost of the digital camera. More specifically, the non-capturing image stage may advantageously be used to provide a secondary image that can be used to modify or otherwise augment, e.g., the focus or dynamic range of the primary image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 16A and FIG. 16B depict a diagram of a stage containing two image capture stages in a single stage for a mobile phone camera.

DETAILED DESCRIPTION OF THE INVENTION

Figure 1:
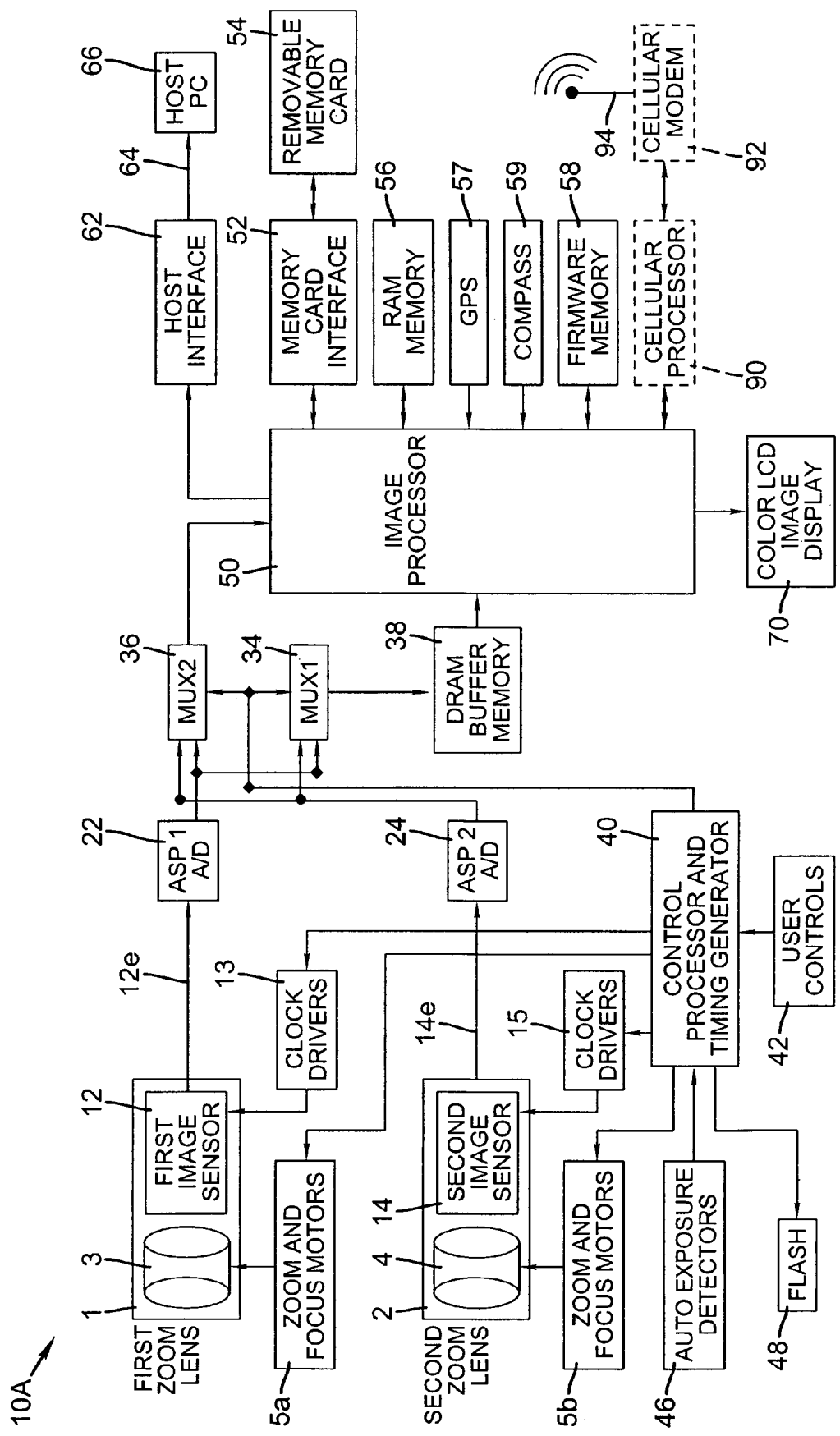
FIG. 1 depicts a block diagram of a first embodiment of a digital camera using a first zoom lens with a first image sensor, and a second zoom lens with a second image sensor according to the invention.

Because digital cameras employing imaging devices and related circuitry for signal processing are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Each of the several embodiments described herein include an image capture assembly, such as a digital camera—still or video—or a digital scanner, having multiple image capture stages, each composed of a lens and an image sensor, wherein the lenses of the multiple image capture stages have different focal lengths to provide an extended optical zoom range for the image capture assembly. The present invention contemplates the use of the multiple image capture stages to provide an enhanced imaging capability, in addition to an enhanced autofocus capability. By using the image capture stages for image capture and autofocus, dedicated autofocus modules can be eliminated thereby reducing the cost and size of the image capture assembly while improving the sharpness of the captured still and video images, as well as increasing the speed of response of the autofocus system.

There are several embodiments by which one image capture stage may be used to capture digital still images or video images while another image capture stage is simultaneously being used for another purpose, such as enhanced autofocus, generation of a secondary image, production of a range map, and the like. In a first embodiment described herein, when a user has set a zoom position to be within a first optical zoom range, a first imaging stage containing a first (e.g., zoom) lens is used to capture a still image or a series of images as in a video sequence, while a second imaging stage simultaneously provides images for the purpose of autofocus of the first imaging stage. Since the second imaging stage is not used to capture the images, the focus conditions of the lens in the second imaging stage can be adjusted over a wider range, e.g., around a peak contrast position (e.g., "hill climb" autofocus) or from the near focus position to the infinity focus position (e.g., "whole way" autofocus) to determine the new best focus setting for the lens in the first imaging stage without detrimentally affecting the focus quality of the images captured by the first imaging stage. When the new best focus condition has been determined using the second imaging stage, the focus condition of the first imaging stage is changed from the previous best focus condition to the new best focus condition.

When the user adjusts the zoom position on the image capture assembly to a second optical zoom range, the camera automatically switches to use the second imaging stage (containing, e.g., a second zoom lens) to capture the images, and begins using the first imaging stage for autofocus of the second imaging stage. Because the two lenses have different focal lengths, they have different magnifications. Therefore, the digital filters used to determine the autofocus may be adjusted, as a function of this difference in magnification, in order to compensate for the differences in magnification.

In a variation of this embodiment, two image capture stages are used together to form a high resolution rangefinder similar to a dual lens rangefinder but with higher resolution, which is provided by the two high resolution image capture stages and a larger separation distance between the two lenses in the two image capture stages. In this variation, the first image capture stage may be used to provide an initial accurate autofocus using a "hill climb" contrast comparison method; subsequently, the first image capture stage is used in conjunction with the second image capture stage as a high resolution rangefinder operating in a differential mode to detect any changes in the distance to the scene that require refocusing prior to capture of a digital still image or prior to or during a video capture. By using the rangefinder in a differential mode, that is, to discern a change in distance from an already focused position to a nearby changed focus position, the impact of environmental changes on the accuracy of the rangefinder is diminished.

In another embodiment described herein, the two image capture stages are both autofocused at the same time using a "hill climb" contrast comparison method prior to capture of a digital still image or capture of a video image by the first image capture stage. The second image capture stage then continues to check the focus by measuring the contrast in the image; when a change in contrast is detected, a second autofocus operation using the "hill climb" contrast comparison method is performed using the second image capture stage to determine the change in focus condition. The focus of the first image capture stage is then changed by an amount proportional to the change in focus determined by using the second image capture stage. Again, a differential focus change measurement is performed from a position established by a "hill climb" autofocus to improve the accuracy of the autofocusing process.

As mentioned in the background of the invention section, a special problem arises during video capture, where the autofocus images are derived from the same series of still images or frames that compose the video images. For instance, during video capture with pan movements of the camera where the scene changes continuously, large portions of the video are actually out of focus as the autofocus system hunts for proper focus. Moreover, many of the frames may be out of focus due to the use of an autofocus system that uses the "hill climb method" to focus, which as mentioned earlier may be unable to discern changing focus under certain conditions where the subject of interest has suddenly shifted in the scene.

Accordingly. in a variation of the foregoing embodiment, when the user has set the zoom position to be within the first optical zoom range, the first imaging stage, including the first zoom lens and its associated image sensor, is used to set the initial focus for taking an image, such as a video image, while the second imaging stage, including the second zoom lens and its associated image sensor, simultaneously provides a continuous "whole-way" autofocus input image to determine if the focus of the first zoom lens should be adjusted as a result of subject motion. Since the second zoom lens and its associated image sensor are not used to capture the motion images, the focus distance can be adjusted from the near focus to the infinity position, in order to determine the best focus setting without affecting the captured motion images. When the user adjusts the zoom position to be outside the first zoom range, the camera automatically switches to the second imaging stage, using the second zoom lens and its associated sensor to capture the motion sequence, and begins using the first imaging stage, with its first lens and associated image sensor, to simultaneously determine if the focus of the second zoom lens should be adjusted as a result of subject motion.

In another embodiment described herein, the two image capture stages are configured as a high resolution rangefinder in order to determine the distances to different portions of the scene in the form of a range map. The range map is then used to modify the captured image signal or the output image for a variety of purposes, such as (without limitation): to improve image processing and enable improved image quality; to improve object identification within the image; to enable object extraction from an image; to enable motion tracking of objects within multiple images; to enable reduced depth of field images by blurring of objects outside of the desired depth of field; to improve the dynamic range within images; to reduce exposure issues introduced by use of a flash; and to improve scene balance within the image.

In another embodiment described herein, and in accordance with the present invention, a first imaging stage, including a first zoom lens and a first image sensor, is used to capture a first (i.e., primary) still image at a first (i.e., primary) focus distance, while a second imaging stage, including a second zoom lens and a second image sensor, is used to simultaneously capture a second (i.e., secondary) still image at a second (i.e., secondary) focus distance. The sensor output from the second imaging stage is used as a secondary output image for modifying the primary output image, thereby generating an enhanced primary image signal. For instance, the secondary still image is used to provide an enhancement signal that may, e.g., sharpen portions of the primary still image that are positioned near the secondary focus distance or may modify the dynamic range of the primary still image.

As mentioned above, the images from both imaging stages may be used to generate a range map identifying the distances to the different portions of the scene. In another embodiment described herein, the camera further includes a GPS unit for providing GPS coordinates for the location of the camera and an electronic compass for providing the pointing direction of the camera. Thereupon, the GPS coordinates for the location of the camera, the pointing direction of the camera, and distance offsets from the range map may be used in order to generate GPS coordinates for portions of the scene.

FIG. 1 depicts a block diagram of an image capture assembly 10A according to the first embodiment of the present invention. Though not an essential aspect of the invention, the image capture assembly 10A is preferably a portable battery operated device, small enough to be easily handheld by a user when capturing and reviewing images. In the preferred embodiment, the image capture assembly 10A is a digital camera that produces both still images and motion video images that are stored on a removable memory card 54. Alternatively, the digital camera may produce and store only motion images or only still images.

The image capture assembly 10A includes two imaging stages 1 and 2, both with zoom lenses 3 and 4. (These stages will hereinafter be referred to in the specification as image capture stages, although in most cases only one stage—at a time—is capturing an image that is stored on the removable memory card 54.) The first zoom lens 3 is controlled by a first lens focus adjuster, e.g., zoom and focus motors 5a, and provides an image to a first image sensor 12. The second zoom lens 4 is controlled by a second lens focus adjuster, e.g., zoom and focus motors 5b, and provides an image to a second image sensor 14. An adjustable aperture and shutter assembly in each zoom lens (not shown) is used to control the exposure to image sensors 12 and 14.

Figure 2B:
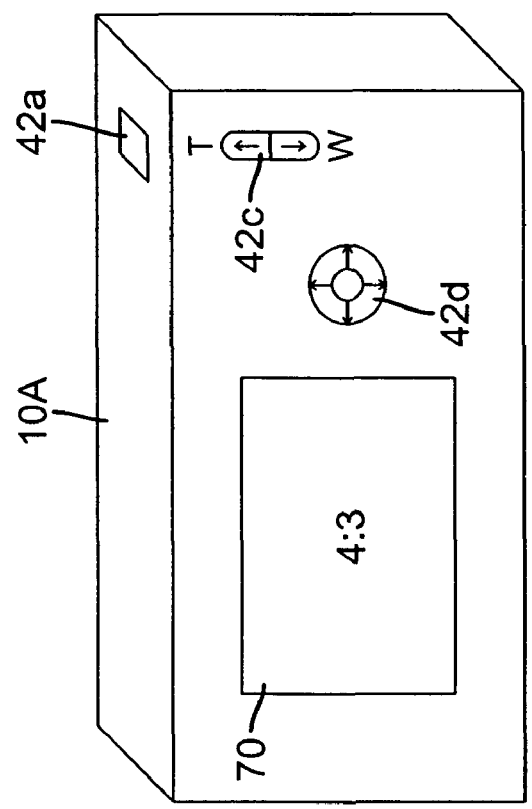
FIGS. 2A and 2B are two perspective views of the digital camera shown in FIG. 1.
Figure 2A:
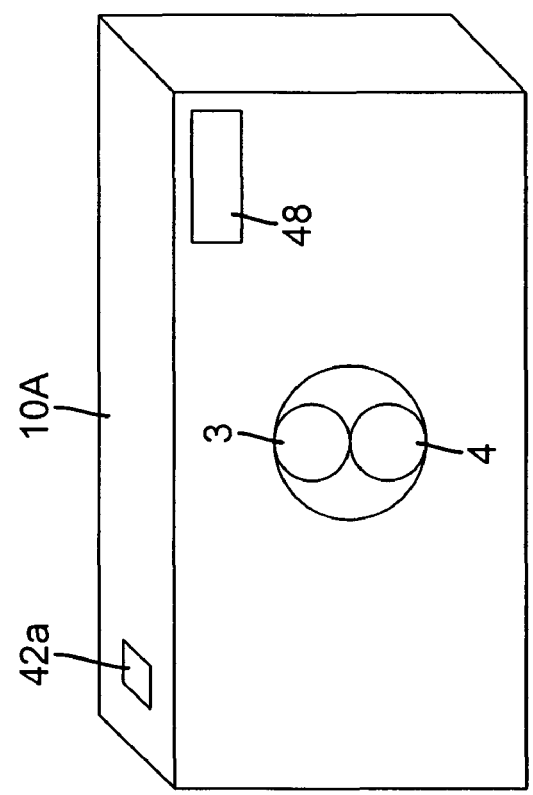

FIGS. 2A and 2B show perspective views of the image capture assembly 10A described in relation to FIG. 1. FIG. 2A is a frontal view of the image capture assembly 10A, showing the first zoom lens 3, the second zoom lens 4 and a flash 48. FIG. 2B is a rear view of the camera 10A, showing a color LCD image display 70 and a number of user controls 42, including a shutter button 42a for enabling an image capture sequence, a zoom button 42c for enabling a selection of a zoom setting, and a multi-position selector 42d for navigating through images, menu choices and the like that are displayed on the color LCD image display 70.

The image capture stages 1 and 2 comprise the zoom lenses 3 and 4 and the image sensors 12 and 14, as shown in FIG. 1.

While zoom lenses 3 and 4 are offset vertically, as shown in FIG. 2a, the zoom lenses 3 and 4 could be offset in other directions, such as horizontally. In addition, according to another embodiment of the invention, one (or both) of the zoom lenses 3 and 4 could be replaced with a fixed focal length lens. In all cases, the optical axes of the zoom lenses 3 and 4 and the sensors 12 and 14 are generally aligned with respect to each other so as to be viewing substantially the same scene, albeit typically with different fields of view. The configuration of the optical components are further described in the aforementioned, commonly assigned U.S. patent application Ser. No. 11/062,174, the disclosure of which is incorporated herein by reference, which includes several embodiments in which more than two image capture stages are used. The configuration of the zoom lenses 3 and 4 in the image capture stages 1 and 2 can include folded optical paths to change the overall dimensions of the image capture stages 1 and 2; however, folded optical paths are not necessary for practice of the present invention.

In a preferred embodiment, the image sensors 12 and 14 are single-chip color megapixel CCD sensors, using the well-known Bayer color filter pattern in order to capture color images, although other sensors, such as CMOS sensors, and other color filter arrays, such as stripe filters, may be used equally well without limitation according to the invention. The image sensors 12 and 14 may have a variety of aspect ratios, for example, a 4:3 image aspect ratio and a variety of resolutions, for example, a total of 6.1 MP effective megapixels (million pixels), with, in this particular case, 2848 active columns of pixels×2144 active rows of pixels. It should also be understood that the image sensors 12 and 14 do not have to have the same specifications. For instance, in some embodiments disclosed in the aforementioned, commonly assigned U.S. patent application Ser. No. 11/062,174, the size, resolution, color filter array, spectral sensitivity and aspect ratio of the image sensors 12 and 14 can be different.

A control processor and timing generator 40 controls the first image sensor 12 by supplying signals to clock drivers 13, and controls the second image sensor 14 by supplying signals to clock drivers 15. The control processor and timing generator 40 also controls the zoom and focus motors 5a and 5b, an auto exposure detector 46, user controls 42, first and second digital multiplexer control elements 34 and 36, and the flash 48 for emitting light to illuminate the scene. The user controls 42 are used to control the operation of the digital camera 10A, as also described earlier in reference to FIG. 2B.

An analog output signal 12e from the first image sensor 12 is amplified and converted to a first digital image signal by a first analog signal processor 22. The digitized first digital image signal is provided to a first input of the first digital multiplexer control element 34 and to a first input of the second digital multiplexer control element 36. An analog output signal 14e from the second image sensor 14 is amplified and converted to a second digital image signal by a second analog signal processor 24. The digitized second digital image signal is provided to a second input of the digital multiplexer control element 34 and a second input of a second digital multiplexer control element 36. The function of the first multiplexer 34 is to select either the first sensor output 12e from the first image sensor 12, or the second sensor output 14e from the second image sensor 14 as the image capture signal. The function of the second multiplexer 36 is to select either the second sensor output 14e from the second image sensor 14 or the first sensor output 12e from the first image sensor 12 as the autofocus image signal, which is provided to an image processor 50.

The control processor and timing generator 40 controls the digital multiplexers 34 and 36 in order to select one of the sensor outputs (12e or 14e) as the captured image signal, and to select the other sensor output (14e or 12e) as the autofocus image signal. The digital data provided by the first digital multiplexer control element 34 is temporarily stored in a DRAM buffer memory 38 and subsequently processed by the image processor 50 to produce a processed digital image file, which may contain a still digital image or a video image. The digital data provided by the second digital multiplexer control element 36 is provided to the image processor 50, which performs autofocus calculations as will be described later in reference to FIGS. 4, 5, 6 and 7.

Briefly summarized, the image processor 50 produces the focus detection signals that drive the first and second focus adjusters, that is, the zoom and focus motors 5a and 5b. The control processor and timing generator 40, in combination with the image processor 50, either (a) selects the sensor output 12e from the first imaging stage 1 as the captured image signal and uses the sensor output 14e from the second imaging stage 2 to generate the focus detection signal for the selected imaging stage 1 or (b) selects the sensor output 14e from the second imaging stage 2 as the captured image signal and uses the sensor output 12e from the first imaging stage 1 to generate the focus detection signal for the selected imaging stage 2. In such a manner, the focus detection signal is applied to the zoom and focus motors 5a and 5b of the selected imaging stage in order to adjust the focus of the image providing the sensor output for the captured image signal.

The processing performed by the image processor 50 is controlled by firmware stored in a firmware memory 58, which may be flash EPROM memory or any other form of appropriate memory. The processor 50 processes the digital input image from the DRAM buffer memory 38, using a RAM memory 56 to store intermediate results during the processing stage. The processed digital image file is provided to a memory card interface 52, which stores the digital image file on the removable memory card 54. Removable memory cards 54 are one type of removable digital image storage medium, and are available in several different physical formats. For example, the removable memory card 54 can include (without limitation) memory cards adapted to well-known formats, such as the Compact Flash, SmartMedia, MemoryStick, MMC, SD, or XD memory card formats. Other types of removable digital image storage media, such as magnetic hard drives, magnetic tape, or optical disks, can alternatively be used to store the still and motion digital images. Alternatively, the digital camera 10A can use internal non-volatile memory (not shown), such as internal Flash EPROM memory to store the processed digital image files. In such an embodiment, the memory card interface 52 and the removable memory card 54 are not needed.

The image processor 50 also receives input from a global positioning system (GPS) unit 57, which enables the image processor 50 to determine the GPS coordinates (i.e., location) of the camera at any appropriate time, e.g., when an image is captured. The image processor also receives directional input from an electronic compass 59, which enables the image processor 50 to determine which direction the camera is pointed, e.g., when an image is captured. The image processor 50 performs various other image processing functions, including color interpolation followed by color and tone correction, in order to produce rendered sRGB image data. The rendered sRGB image data is then JPEG compressed and stored as a JPEG image file on the removable memory card 54. The rendered sRGB image data may also be provided to a host PC 66 via a host interface 62 communicating over a suitable interconnection 64, such as a SCSI connection, a USB connection or a Firewire connection. The JPEG file preferably uses the so-called "Exif" image format defined in "Digital Still Camera Image File Format (Exif)" version 2.2 by the Japan Electronics and Information Technology Industries Association (JEITA), Tokyo, Japan. This format includes an Exif application segment that stores particular image metadata, including the date/time the image was captured, as well as the lens f/number, GPS location and pointing direction when the image was captured and other camera settings.

It should be noted that the image processor 50, while typically a programmable image processor, can alternatively be, for example, a hard-wired custom integrated circuit (IC) processor, a general purpose microprocessor, or a combination of hard-wired custom IC and programmable processors. Furthermore, one or more of the functions shown as separate blocks in FIG. 1, such as the digital multiplexer control elements 34 and 36, the DRAM buffer memory 38, and the RAM memory 58, can be incorporated in an IC containing the image processor 50. It should also be noted that the functions of at least certain portions of the control processor 40 and the image processor 50 may be merged as needed for purposes of certain applications and discussions, such as in the reference to a processing stage in this description and in certain of the claims, where, e.g., selection of a sensor output (as by the control processor 40) and generation of a focus signal (as by the image processor 50) are referred to. In other words, the recitation of a processing stage is intended to encompass the recited functions, whether they are to be found in one or more actual processing elements, circuits, or the like.

In a further embodiment of the present invention, the digital camera 10A is included as part of a camera phone. In such an embodiment, the image processor 50 also interfaces to a cellular processor 90, which uses a cellular modem 92 to transmit digital images to a cellular network (not shown) using radio frequency transmissions via an antenna 94. In some embodiments of the present invention, the two image capture stages 1 and 2, and the zoom and focus motors 5a and 5b may be part of an integrated assembly. In addition, the clock drivers 13 and 15, as well as the analog signal processors 22 and 24 and the analog/digital converters included therewith, may be part of the integrated assembly.

Figure 3:
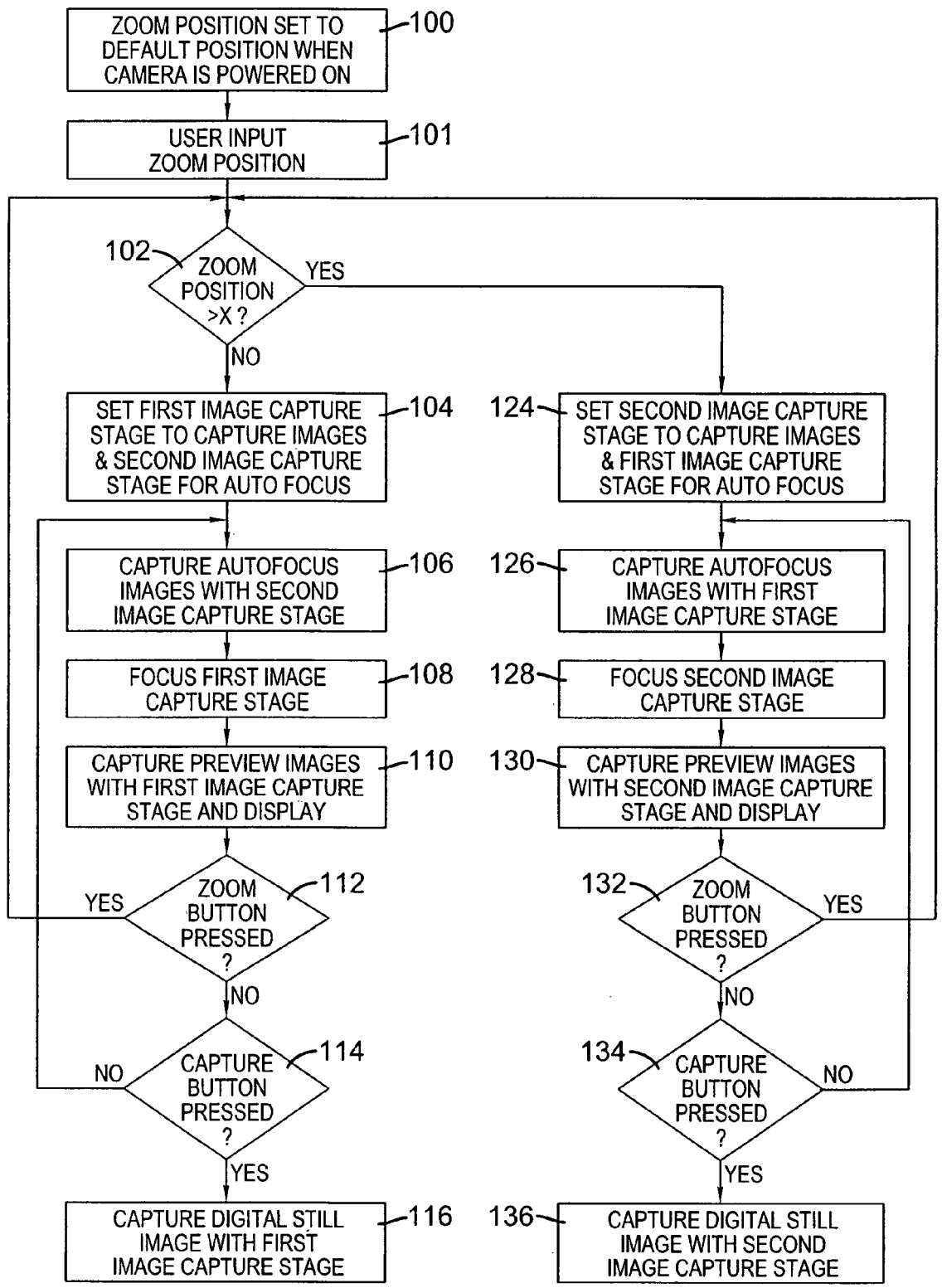
FIG. 3 depicts a flow diagram showing a method for performing autofocus and for capturing digital still images according to a first embodiment of the digital camera shown in FIG. 1.

FIG. 3 depicts a flow diagram showing a method for capturing digital images using the image capture assembly of FIG. 1. In block 100, when the camera 10A is turned ON using a power switch (not shown), the zoom lenses 3 and 4 are set to their default positions, which is preferably a wide angle position where the output of the first image sensor 12 is used to capture images in a preview mode for display on the color LCD image display 70 to enable the user to compose the images to be captured. As part of composing the images, in block 102 the user typically presses the zoom button 42c in order to set a desired field of view for the digital camera 10A.

In block 102, the zoom position setting is compared to a value X at which the image capture function switches from the first image capture stage to the second image capture stage. In block 104, if the zoom position setting is less than X (a negative response to block 102), then the first image capture stage 1 is used to capture images in the preview mode, while the second image capture stage 2 is used to capture autofocus images. The first image capture stage 1 continues to capture images for preview on the display 70 (block 110) while, in block 106, the second image capture stage 2 is used to capture autofocus images for autofocus of the first image capture stage 1, which are processed by the image processor 50 and used in block 108 to focus the first image capture stage 1.

In block 112, if the zoom button 42c is not pressed, and in block 114 if the capture button is pressed, a digital image is captured in block 116 with the first image capture stage 1. Alternatively, if the zoom button is pressed in block 112, control is returned to block 102, and if the capture button is not pressed in block 114, control is returned to block 106.

In block 124, if the zoom position setting is greater than X (a positive response to block 102), then the second image capture stage 2 is used to capture images in the preview mode, while the first image capture stage 1 is used to capture autofocus images. The second image capture stage 2 continues to capture images for preview on the display 70 (block 130) while, in block 126, the first image capture stage 1 is used to capture autofocus images for autofocus of the second image capture stage 2, which are processed by the image processor 50 to generate a focus detection signal that is used in block 128 to focus the second image capture stage 2.

In block 132, if the zoom button 42c is not pressed, and in block 134 if the capture button is pressed, a digital image is captured in block 136 with the second image capture stage 2. Alternatively, if the zoom button is pressed in block 132, control is returned to block 102, and if the capture button is not pressed in block 134, control is returned to block 126.

Figure 4:
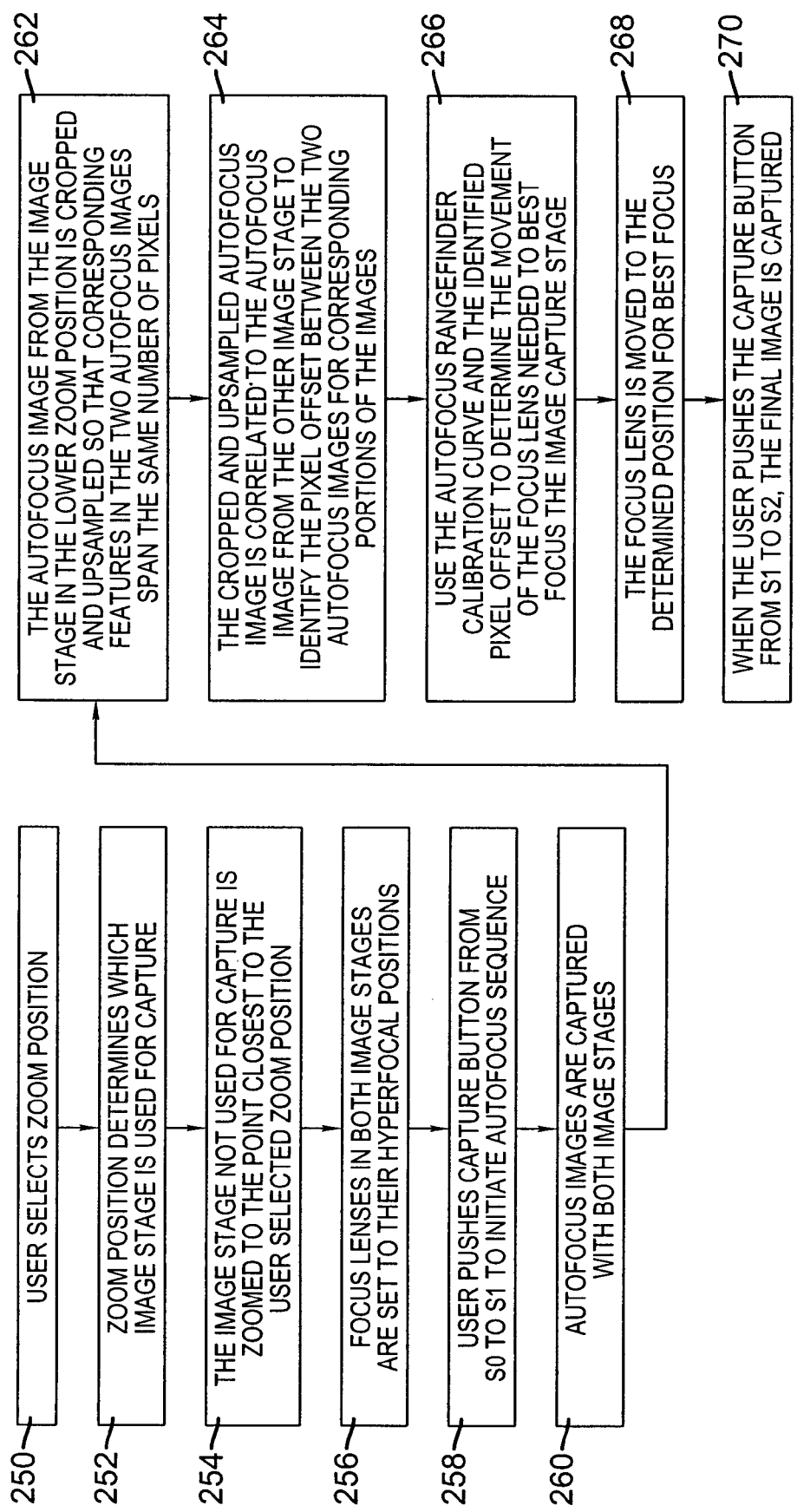
FIG. 4 depicts a flow diagram showing a method for performing autofocus using a rangefinder method with two image capture stages.

A flow chart of an autofocus process using the two image capture stages shown in FIG. 3 in a rangefinder configuration is shown in FIG. 4, where the rangefinder method is used in blocks 108 and 128 of FIG. 3 to autofocus the images from the first and second image capture stages. In block 250, the user determines the zoom position by adjusting the zoom control 42c on the camera, which in turn dictates, as described above, which image capture stage will be used to capture the final image and which image capture stage will be used only for autofocus images (block 252). The image capture stage that will not be used for capture of the final image is zoomed to a position closest to the transition zoom position between the two zoom lens systems in the two image capture stages (block 254). The focus lenses of the two image stages are moved to their respective hyperfocal positions, wherein the greatest focus range is produced (block 256). In block 258, the user presses the capture button 42a from a position S0 to a position S1 to initiate the autofocus sequence (and the autoexposure sequence). (The capture button has 3 positions: S0 is the neutral position that the button maintains prior to the operator touching the capture button; S1 is the intermediate position in which the camera performs autofocus and autoexposure; S2 is the final position in which the camera performs a final autoexposure and captures the final image.)

Figure 17A:
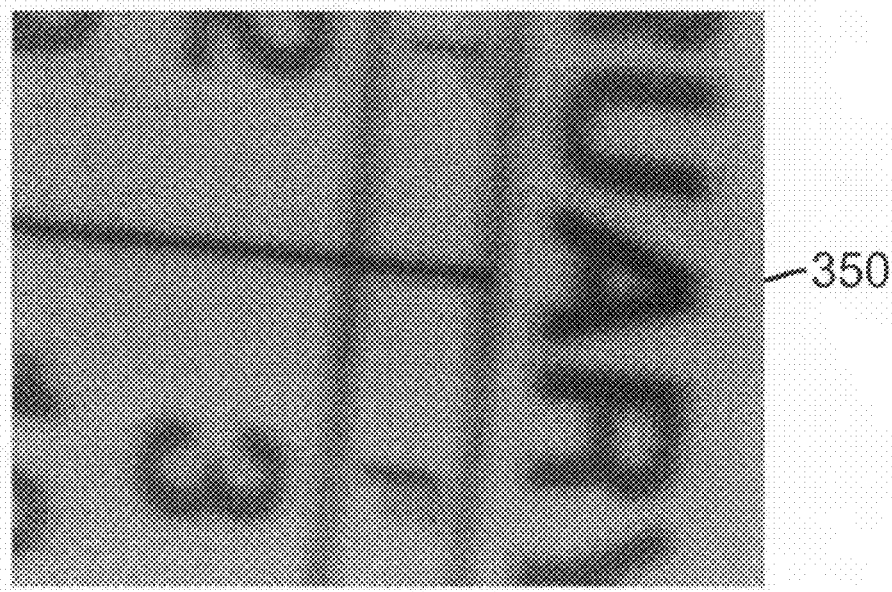
FIG. 17A and FIG. 17B are representations of images captured with two image capture stages showing the offset between the two images that is used to determine the distance to portions of the scene.
Figure 17B:
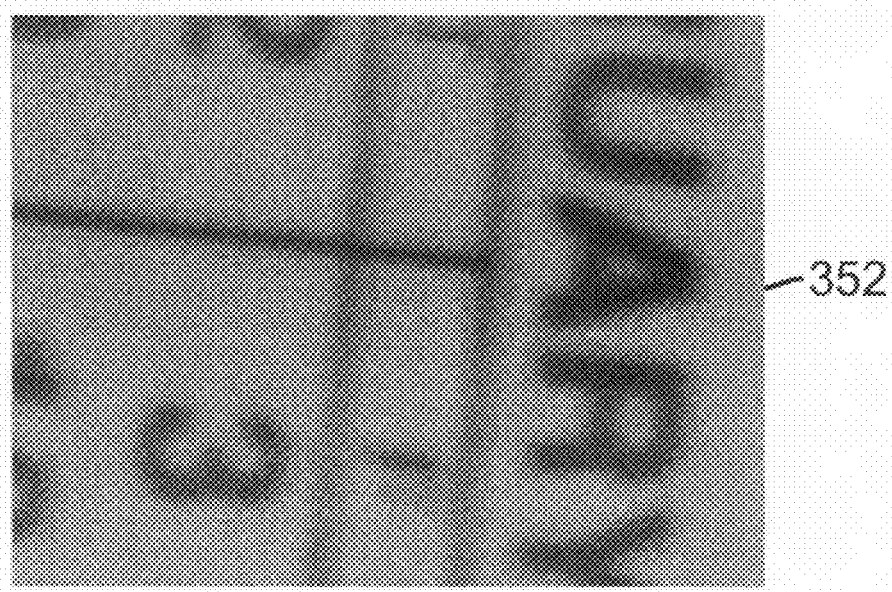

Autofocus images are then captured by both image stages (block 260) with their zoom lenses at their respective zoom positions. The autofocus image from the image stage in the lower zoom position, i.e., where the zoom position is less than X (see block 102 in FIG. 3), is then cropped and upsampled so that corresponding features in the two autofocus images span the same number of pixels (block 262). The cropped and upsampled autofocus image is then correlated with the other autofocus image to identify the pixel shift between the two autofocus images (block 264) and thereby produce the focus detection signal. FIG. 17A shows a representation of the autofocus image 350 as captured from the higher zoom position image stage. FIG. 17B shows a representation of a cropped and upsampled autofocus image 352 from the image stage in the lower zoom position. These representations show the offset between the two images that is used to determine the distance to portions of the scene. In block 266, a calibration factor is then applied to the focus detection signal to determine the distance that the focus lens must be moved to produce a best focus condition for the image capture. In block

268, the focus detection signal is applied to the zoom and focus motor 5a and the focus lens is then moved the determined distance in the image capture stage that will be used for the final image capture to produce the condition for best focus 268. When the user pushes the capture button from S1 to S2, the image capture stage capture the final image.

Figure 5:
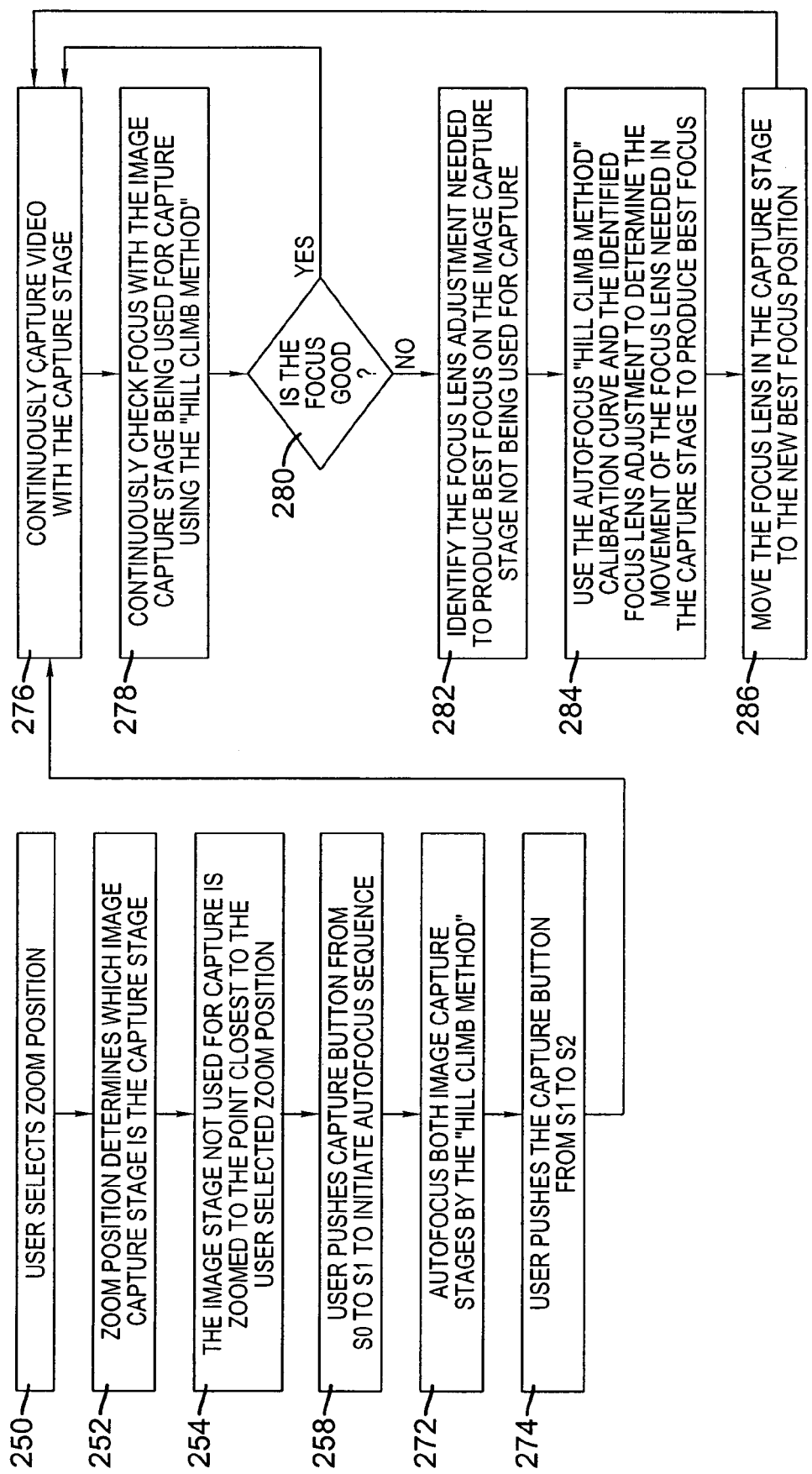
FIG. 5 depicts a flow diagram showing a method for performing autofocus using a "hill climb method" with two image capture stages.

A flow chart of an autofocus process using the two image capture stages shown in FIG. 3 in a well known "hill climb" contrast comparison method is shown in FIG. 5, where the "hill climb" contrast comparison method is used in blocks 108 and 128 of FIG. 3 to autofocus the images from the first and second image capture stages. In block 250, the user selects a zoom position. The zoom position determines which imaging stage will be used as the capture stage (block 252). Then, in block 254, the image capture stage not used for capture is zoomed to the point closest to the user selected zoom position from block 250. In block 258, the user pushes the capture button 42a from the S0 position to the S1 position to initiate an autofocus sequence. Then, in block 272, both image capture stages are autofocused by the "hill climb" method. When the user pushes the capture button from the S1 position to the S2 position (block 274), video images are continuously captured by the capture stage (block 276).

In order to maintain focus with a minimal amount of hunting, focus is continually checked in block 278 with the image capture stage not being used for capture using the "hill climb" contrast comparison method. Then, in the decision block 280, if the focus is good, control is returned to block 276 and video images are continuously captured by the capture stage. If, in the decision block 280, if the focus is not good, then the focus lens adjustment is identified (block 282) that is needed to produce best focus on the image capture stage not being used for capture. In block 284, the autofocus "hill climb" method calibration curve and the identified focus lens adjustment is used to determine the movement of the focus lens needed in the capture stage to produce best focus, thereby producing a focus change detection signal. Finally, in block 286, the focus change detection signal is applied to the zoom and focus motor 5a or 5b and the focus lens in the capture stage is moved to the new best focus position, and control is returned to block 276 and video images are continuously captured by the capture stage.

Alternatively, and also in order to maintain focus with a minimal amount of hunting, focus is continually checked in block 278 with the image capture stage not being used for capture using the "whole way" autofocus method. Accordingly, in block 284, an autofocus "whole way" method calibration curve and the identified focus lens adjustment is used to determine the movement of the focus lens needed in the capture stage to produce best focus, thereby producing a focus change detection signal. Finally, in block 286, the focus change detection signal is applied to the zoom and focus motor 5a or 5b and the focus lens in the capture stage is moved to the new best focus position, and control is returned to block 276 and video images are continuously captured by the capture stage.

Figure 6:
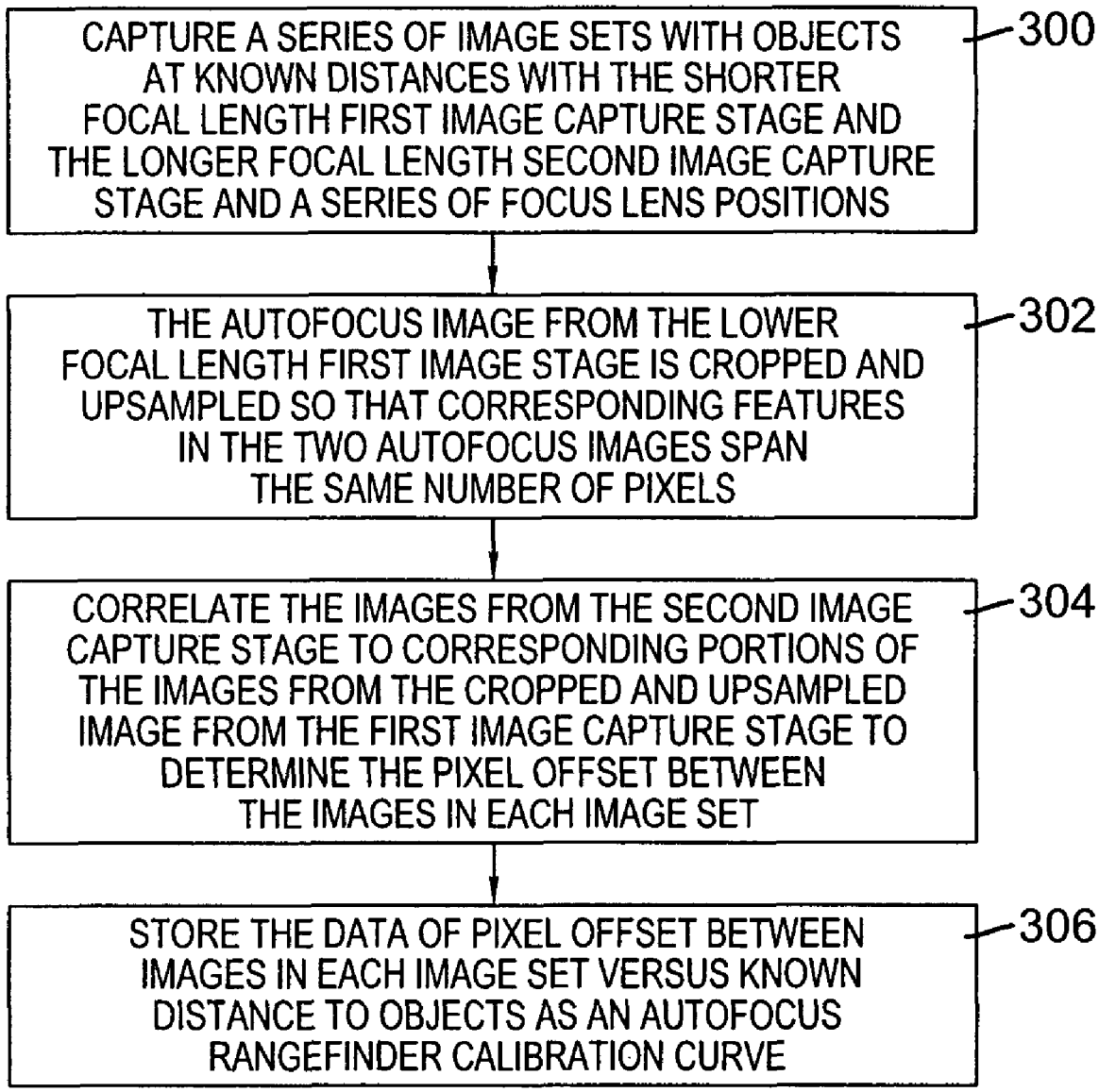
FIG. 6 depicts a flow diagram showing a method for producing an autofocus rangefinder calibration curve.
Figure 7:
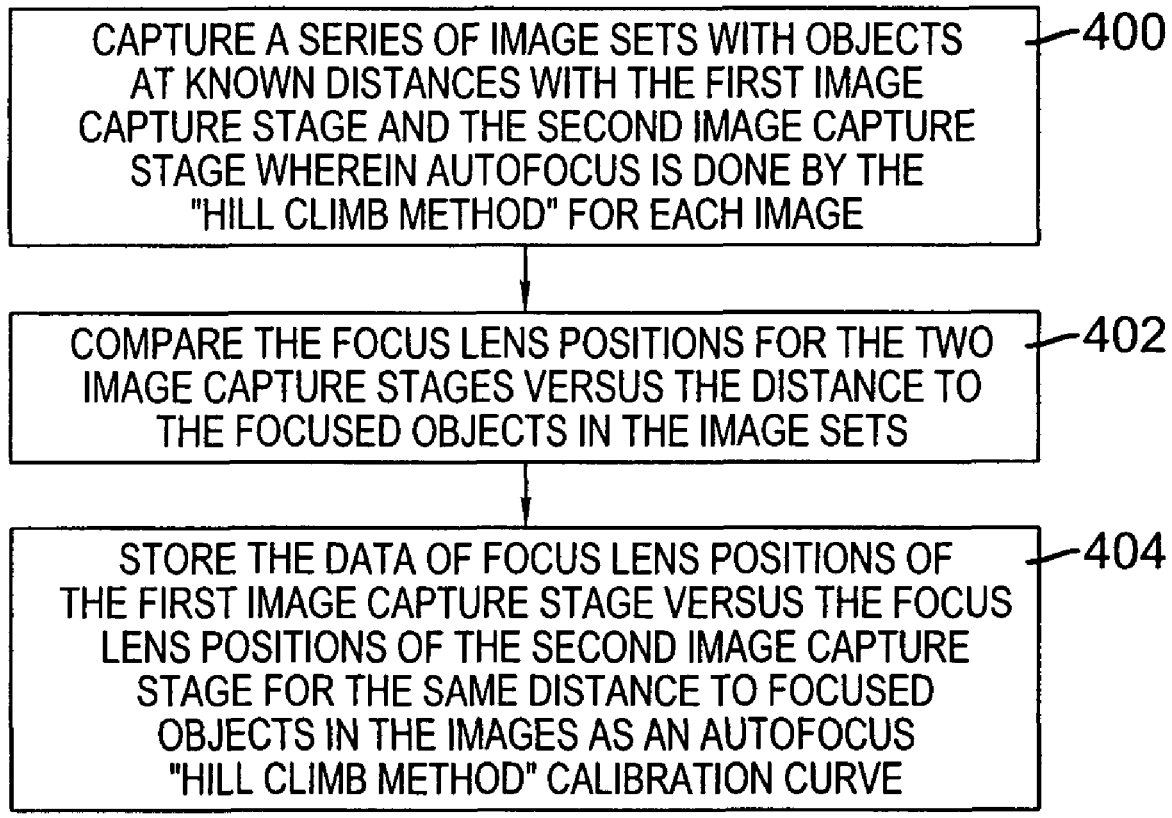
FIG. 7 depicts a flow diagram showing a method for producing an autofocus "hill climb method" calibration curve.

Calibration curves are used in both FIGS. 4 and 5 to determine the movement of the focus lens needed in the capture stage to produce best focus. FIGS. 6 and 7 depict flow diagrams for calculating these curves. More specifically, FIG. 6 depicts calculation of the autofocus rangefinder calibration curve used in block 266 of FIG. 4. In block 300 of FIG. 6, a series of image sets are captured with objects at known distances, using the shorter focal length first image capture stage and the longer focal length second image capture stage at a series of focus lens positions. Then, in block 302, the autofocus image from the lower focal length first image stage is cropped and upsampled so that corresponding features in the two autofocus images span the same number of pixels as shown in FIGS. 17A and 17B. In block 304, the images from the second image capture stage are correlated to corresponding portions of the images from the cropped and upsampled image from the first image capture stage to determine the pixel offset between the images in each image set. Thereupon, in block 306, the data of pixel offset between images in each image set versus known distance to objects is stored as the autofocus rangefinder calibration curve for use in block 266 of FIG. 4.

FIG. 7 depicts calculation of the "hill climb" calibration curve used in block 284 of FIG. 5. In block 400 of FIG. 7, a series of image sets are captured with objects at known distances, using the first image capture stage and the second image capture stage—wherein autofocus is done by the "hill climb" method for each image. Then, in block 402, the focus lens positions is compared for the two image capture stages versus the distance to the focused objects in the image sets. Then, the data of focus lens positions of the first image capture stage versus the focus lens positions of the second image capture stage for the same distance to focused objects in the images is stored as an autofocus "hill climb" method calibration curve for use in block 284 of FIG. 5.

Figure 8:
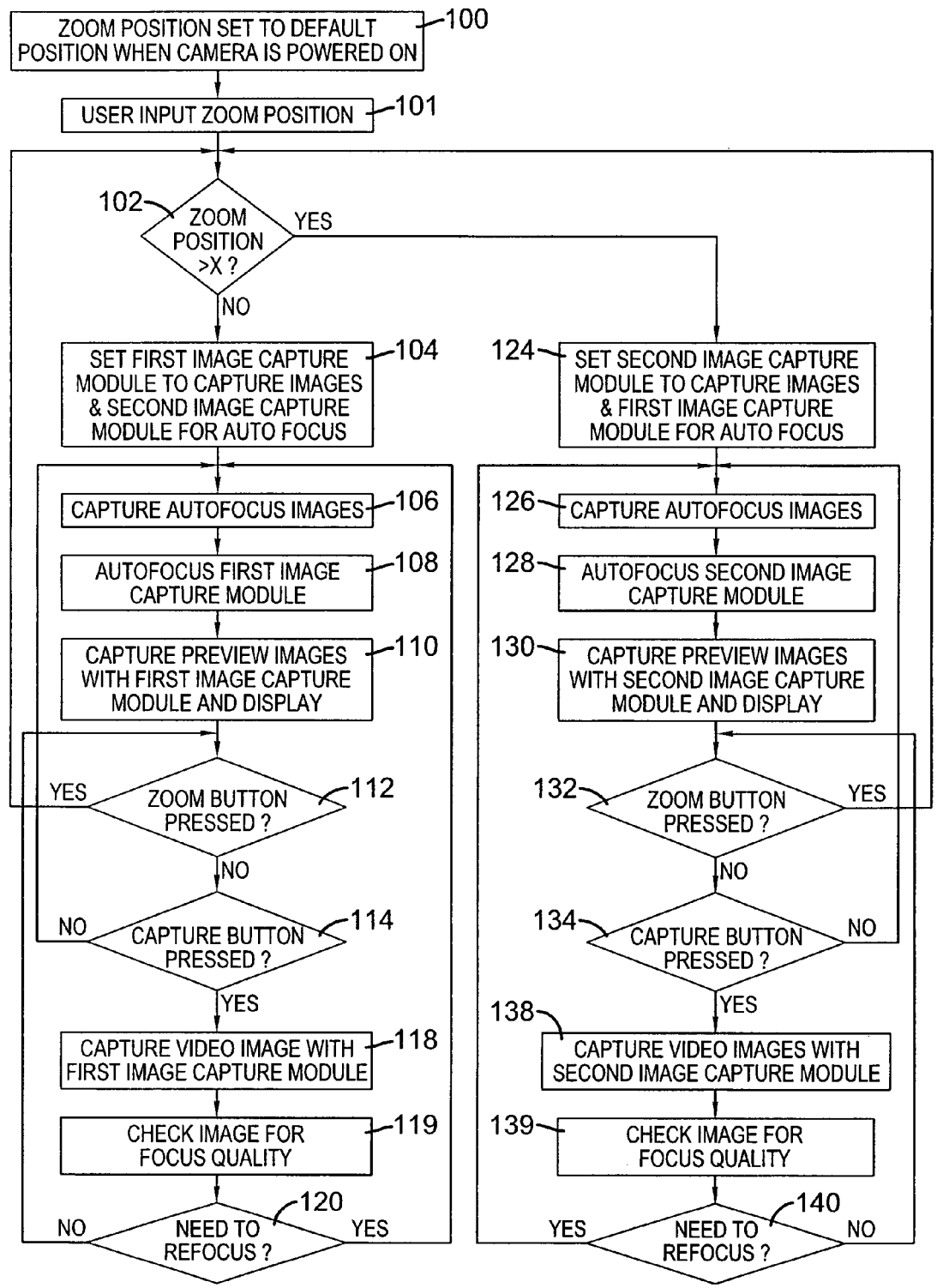
FIG. 8 depicts a flow diagram showing a method for performing autofocus and for capturing digital video images according to a second embodiment of the digital camera shown in FIG. 1.

FIG. 8 depicts a flow diagram showing a method for capturing video images using the image capture assembly of FIG. 1. Much of the flow diagram duplicates the functional elements shown in FIG. 3, and will not be repeated here where the same functions and reference characters are indicated. If the zoom position setting is less than X (a negative response to block 102), then the first image capture stage 1 is used to capture video images, while the second image capture stage 2 is used to capture autofocus images. The focus of the first image capture stage is performed as described in FIG. 3, except it is now for a video image. Subsequently, in block 112 in FIG. 8, if the zoom button 42c is not pressed, and in block 114 if the capture button is pressed, a video image is captured in block 118 by the first image capture stage 1. The video image is checked for focus quality in block 119, and if there is a need to refocus, control is returned to block 106 and the focus change detection signal is generated, which is used in block 108 to drive the focus motor 5a for the first image capture stage 1. If there is no need to refocus, then control is returned to block 112.

If the zoom position setting is greater than X (a positive response to block 102), then the second image capture stage 2 is used to capture video images, while the first image capture stage 1 is used to capture autofocus images. The focus of the second image capture stage is performed as described in FIG. 3, except it is now for a video image. Subsequently, in block 132, if the zoom button 42c is not pressed, and if in block 134 if the capture button is pressed, a video image is captured in block 138 with the second image capture stage 2. The video image is checked for focus quality in block 139, and if there is a need to refocus, control is returned to block 126 and the focus change detection signal is generated, which is used in block 128 to drive the focus motor 5b for the second image capture stage 2. If there is no need to refocus, then control is returned to block 132.

Figure 9:
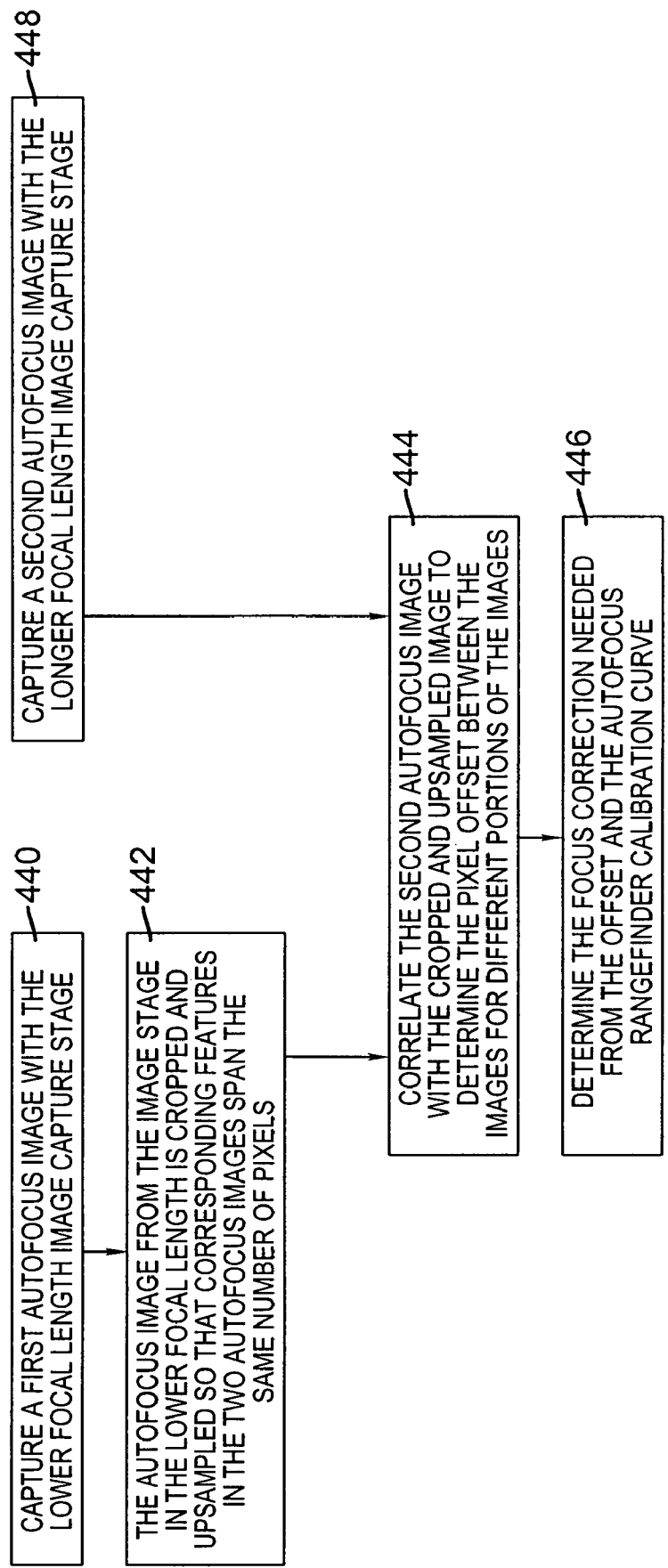
FIG. 9 depicts a flow diagram showing a method for performing autofocus with a rangefinder method with two image capture stages.

A flow chart of an autofocus process using the two image capture stages shown in FIG. 8 in a rangefinder configuration is shown in FIG. 9, where the rangefinder method is used in blocks 108 and 128 of FIG. 8 to autofocus the images from the first and second image capture stages. In block 440 of FIG. 9, a first autofocus image is captured with the lower focal length image capture stage. Then, in block 442, the autofocus image from the image stage in the lower focal length is cropped and upsampled so that corresponding features in the two autofocus images span the same number of pixels. Meanwhile, in block 448, a second autofocus image is captured with the longer focal length image capture stage. The second autofocus image is correlated in block 444 with the cropped and upsampled image to determine the pixel offset between the images for different portions of the images. Then, in block 446, the focus correction needed is determined from the offset and the autofocus rangefinder calibration curve (which was calculated in FIG. 6).

Figure 10:
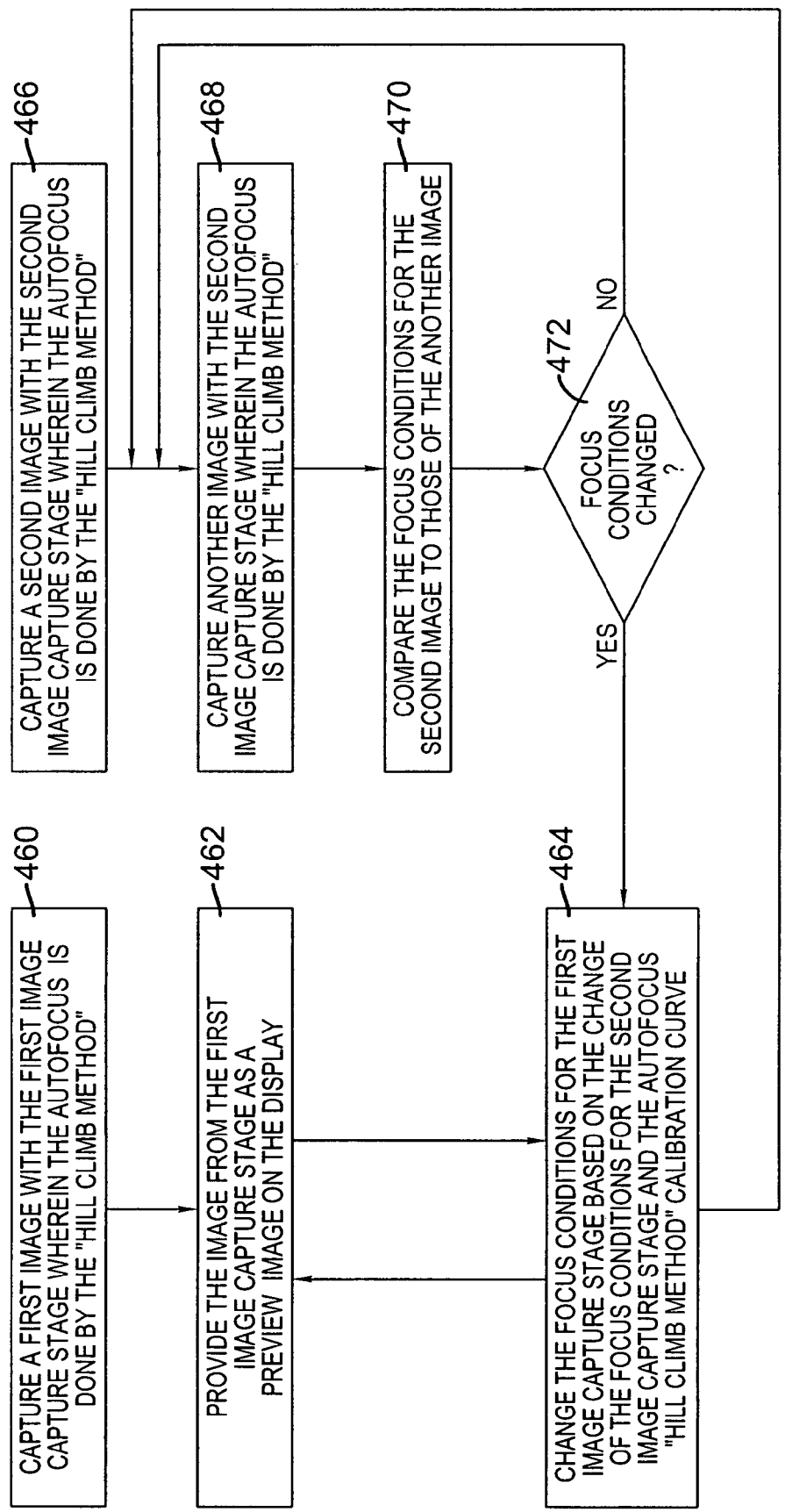
FIG. 10 depicts a flow diagram showing a method for performing autofocus with a "hill climb method" with two image capture stages.

A flow chart of an autofocus process using the two image capture stages shown in FIG. 8 in a "hill climb" contrast comparison method is shown in FIG. 10, where the "hill climb" contrast comparison method is used in blocks 108 and 128 of FIG. 8 to autofocus the images from the first and second image capture stages. In block 460 of FIG. 10, a first image is captured with the first image capture stage, wherein the autofocus is done by the "hill climb" method. Then, in block 462, the image from the first image capture stage is provided as a preview image on the display. Meanwhile, in block 466, a second image is captured with the second image capture stage, wherein the autofocus is done by the "hill climb" method. Then, in block 468, another, subsequent image is captured with the second image capture stage, wherein the autofocus is also done by the "hill climb" method. In block 470, the focus conditions for the second image are compared to those of the subsequent image. Then, if the focus conditions have changed (positive response to block 472), the focus conditions are changed for the first image capture stage based on the change of the focus conditions for the second image capture stage and the autofocus "hill climb" method calibration curve (which was calculated in FIG. 7). If the focus conditions have not changed (negative response to block 472), control is returned to block 468 and another image is captured with the second image capture stage.

Alternatively, and in order to maintain focus with a minimal amount of hunting, focus is continually checked in block 470 with the second image capture stage using the "whole way" autofocus method. Accordingly, if the focus conditions have changed (positive response to block 472), the focus conditions are changed for the first image capture stage based on the change of the focus conditions for the second image capture stage and an autofocus "whole way" method calibration curve. If the focus conditions have not changed (negative response to block 472), control is returned to block 468 and another image is captured with the second image capture stage.

Figure 11:
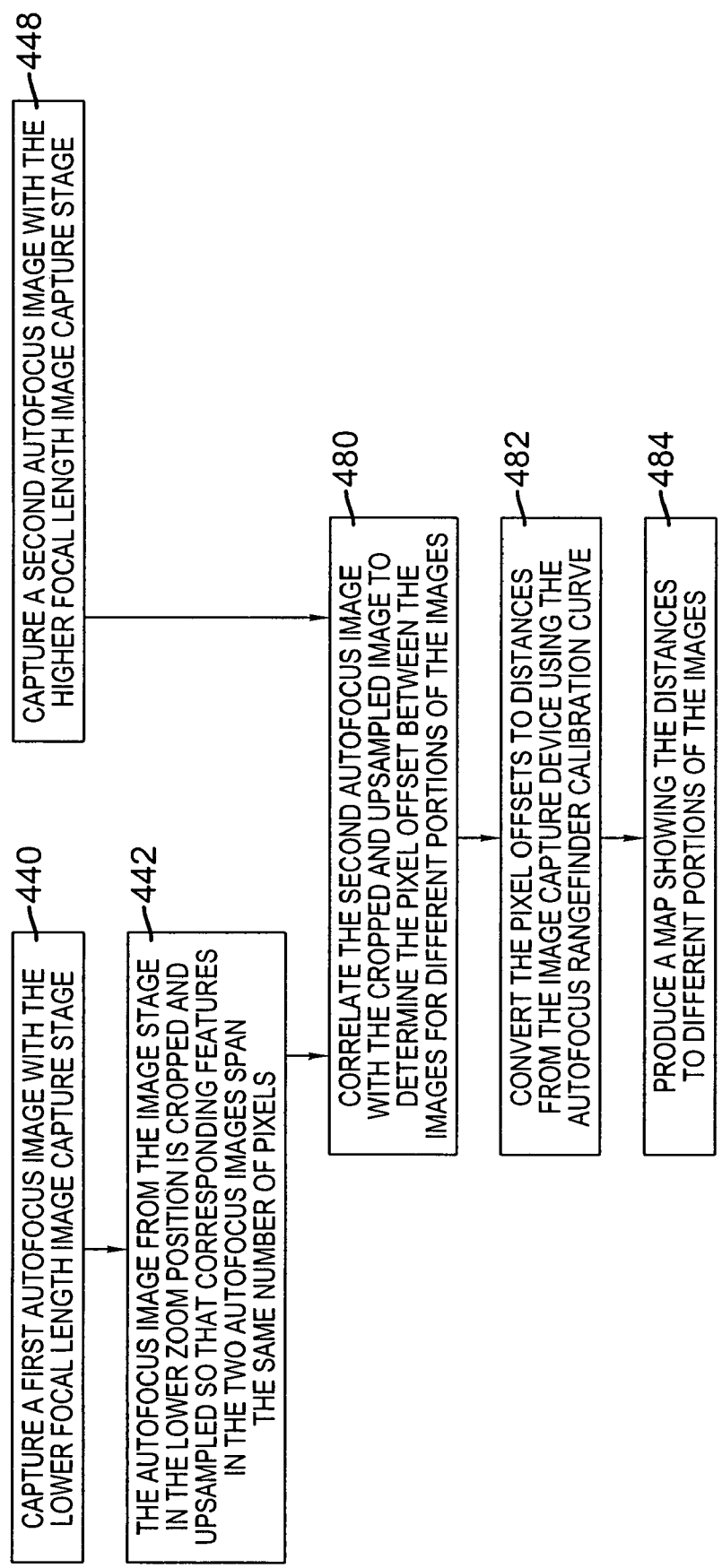
FIG. 11 depicts a method for producing a range map with two image capture stages.

FIG. 11 depicts a flow diagram showing a method for processing images captured using the image capture assemblies of FIG. 3 or 8, wherein a range map is produced. (Certain parts of the diagram bear the same functions and reference characters as used in FIG. 9.) Methods to produce a rangemap are well known to those skilled in the art; for example, a description of a method for producing a rangemap or depth map from a disparity map produced from the pixel offset information for a set of images captured by multiple cameras with similar fields of view is described in United States Patent Application Publication Number 2006/0193509 (published Aug. 31, 2006 in the names of Antonio Criminisi et al., and entitled "Stereo-based Image Processing"), which is incorporated herein by reference. In the case described in the present patent application, two or more image capture devices are included in a single electronic camera. Since the two or more image capture devices have different focal lengths, at least one of the images must be modified to make the two or more images comparable to enable the pixel offsets to be determined. Referring now to FIG. 11, in block 440 a first autofocus image is captured with the lower focal length image capture stage and, in block 442, the autofocus image from the image capture stage in the lower zoom position is cropped and upsampled so that corresponding features in the two autofocus images span the same numbers of pixels. Meanwhile, in block 448, a second autofocus image is captured with the higher focal length image capture stage. Then, in block 480, the second autofocus image is correlated with the cropped and upsampled image to determine the pixel offset between the images for different portions of the images. The pixel offsets are then converted in block 482 to distances from the image capture device using the autofocus rangefinder calibration curve. A map is then produced in block 484 showing the distances to different portions of the images.

The distance from the image capture device to portions of the scene can be calculated from the measured pixel offsets between corresponding portions of the first and second autofocus images, that is, between corresponding portions of the cropped and upsampled image obtained in block 442 from the first autofocus image and the second autofocus image obtained from block 448. The relationship between the pixel offset as experienced on the image sensors p, the pixel size m, the spacing between lenses s, the effective focal length of the lens f and the distance d to the portion of the scene is given as $$d = s \cdot f / (p \cdot m)$$

Table 1 shows typical pixel offsets for an image capture device as described. In a preferred embodiment, the relationship between pixel offset and distance to portions of the scene is calibrated against objects in a scene with known distances to compensate for any unexpected variations in dimensions and any angular tilt between the two lens assemblies.

TABLE 1

| Pixel size (mm) | 0.002 |
| Separation between lenses (mm) | 20 |
| Focal Length (mm) | 6 |

| Distance (ft) | Distance (mm) | Offset (pixels) |
| --- | --- | --- |
| 0.5 | 152.4 | 393.7 |
| 1 | 304.8 | 196.9 |
| 2 | 609.6 | 98.4 |
| 4 | 1219.2 | 49.2 |
| 8 | 2438.4 | 24.6 |
| 16 | 4876.8 | 12.3 |
| 32 | 9753.6 | 6.2 |
| 64 | 19507.2 | 3.1 |
| 128 | 39014.4 | 1.5 |

As mentioned earlier, The range map is then used to modify the captured image signal or the output image for a variety of purposes, such as (without limitation):

a) to improve object identification within the image by identifying the continuous boundaries of the object so the shape of the object can be defined;

b) to enable object extraction from an image by identifying the continuous boundaries of the object so it can be segmented within the image;

c) to enable motion tracking of objects within multiple images by identifying objects so they can be tracked as the same object between images;

d) to enable dynamic depth of field images by blurring of portions of the image that correspond to areas of the scene that lie outside of the desired depth of field;

e) to improve the dynamic range within images by applying gain adjustments to objects as a whole;

f) to reduce exposure issues introduced by use of a flash by reducing the gain on the portions of the image that correspond to objects in the foreground and increasing the gain on objects in the background;

g) to improve scene balance within the image by enabling objects in the foreground to be emphasized.

In order to understand the use of a range map for purposes such as noted above, it is helpful to consider an example. Assume that a user/photographer has a great picture of the Alaskan mountains—beautiful clouded sky and white-capped mountains in the most distant ranges, flowers carpeting the fields in the mid range, and a black dog sitting in the foreground about 5 feet away. However, the clouds are blown out (over-exposed), as are the white-capped mountains. The black dog is too dark (underexposed) and out of focus (because, e.g., the camera was set on landscape mode). Using the range data, several features of the image can be modified. The exposure for various locations can be improved by applying gain adjustments to selected object portions of the image: in particular, e.g., to the cloud detail, the snow detail, and the fur on the black dog. More generally, the range map can be used to improve dynamic range within the output image by applying gain adjustments to objects as a whole within the output image, and independently of their position in the range map. Moreover, the depth of field can be adjusted so that, e.g., the dog is in focus, the mountains are in focus and so are those great flowers. Or, if the user really wants to emphasize the dog more than the beautiful scenery, the range data can be used to isolate the mountains and the flowers, which can then be blurred, and further to isolate the dog, which is sharpened to obtain a nice sharp image. As can be understood, given the availability of a range map according to the invention, there are numerous other uses that would be available for artistically optimizing the image. For instance, the user can make a dynamic depth of field, that is, with mixed regions of the ranges in focus. More generally, the range map can be used to enable dynamic depth of field images by blurring portions of the output image, independently of their position in the range map, that correspond to areas of the scene that lie outside of a desired depth of field for a featured portion of the image. For example, the dog and mountains, albeit they are at opposite range extremes, could be brought in focus because they are the regions of interest and the flowers in the mid range can be blurred smoothly.

Figure 12:
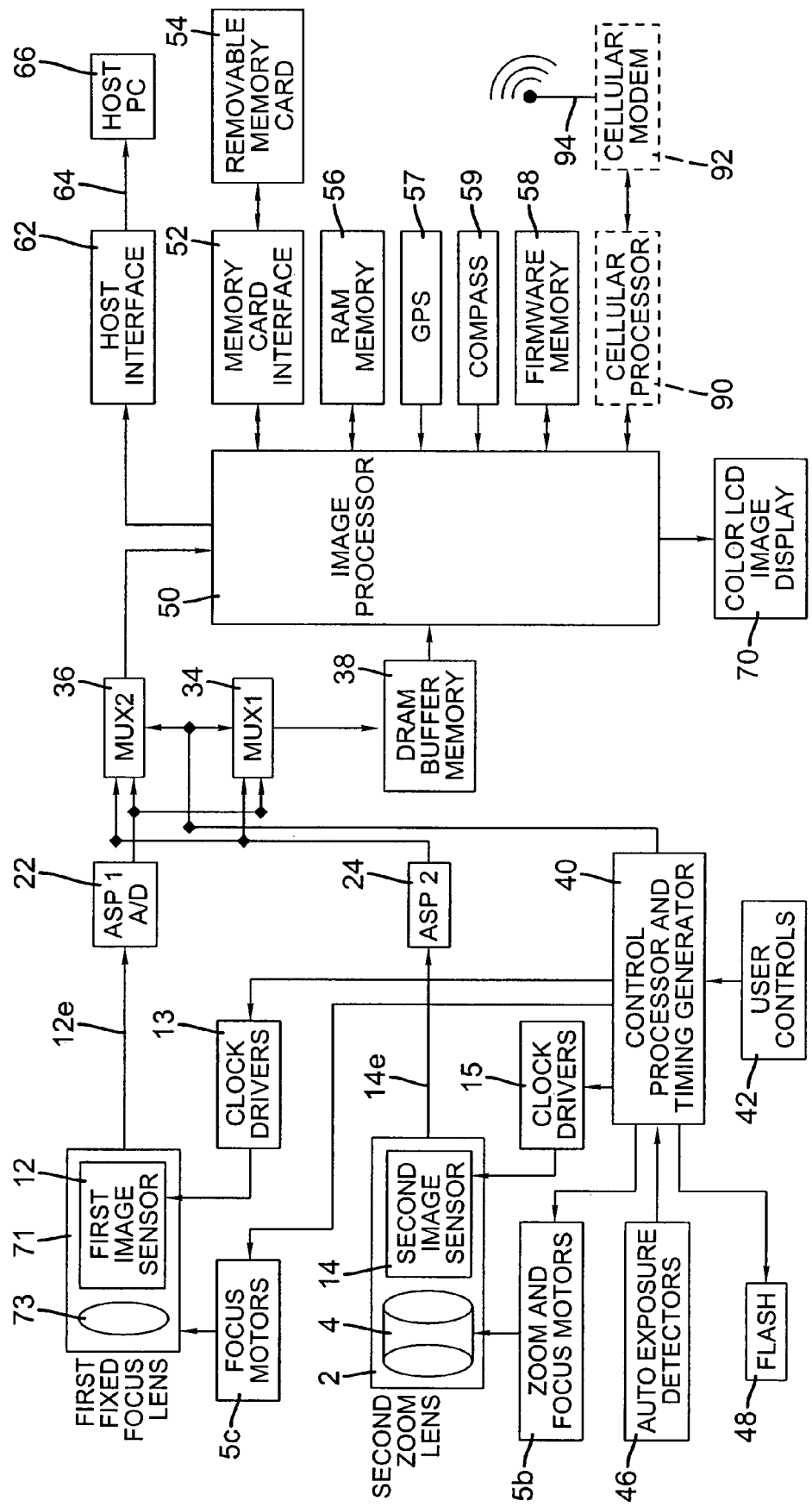
FIG. 12 depicts a block diagram of another embodiment of a digital camera using a first fixed focal length lens with a first image sensor, and a second (zoom) lens with a second image sensor.
Figure 13:
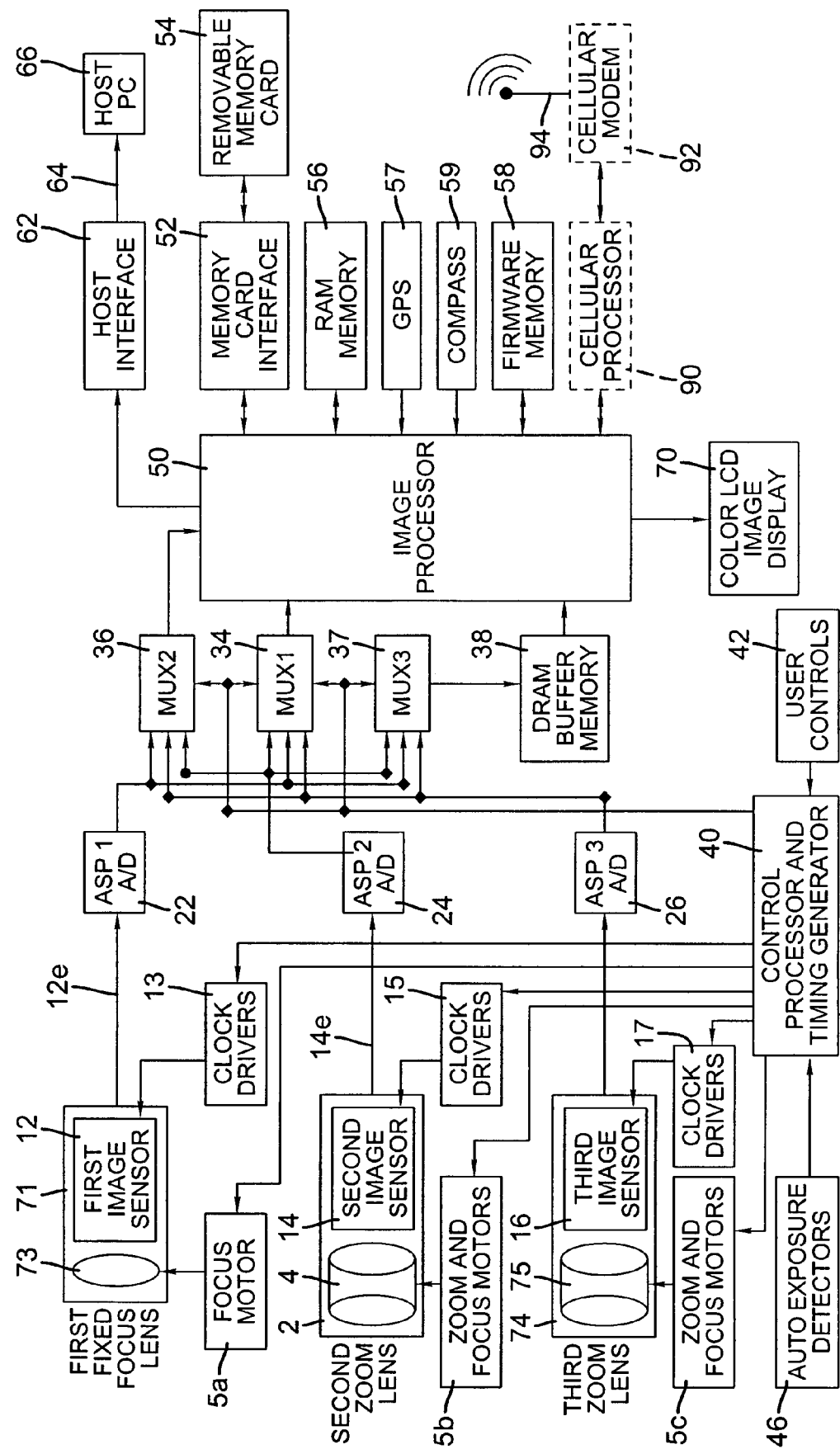
FIG. 13 depicts a block diagram of another embodiment of a digital camera using a first fixed focal length lens with a first image sensor, a second (zoom) lens with a second image sensor, and a third (zoom) lens with a third image sensor.

FIGS. 12 and 13 show block diagrams of digital cameras using different variations of the optical image capture stages. Most components subsequent to the image capture stages are the same as those described in connection with FIG. 1, and will not be further described here. FIG. 12 depicts a block diagram of a digital camera having a first image capture stage 71 and a second image capture stage 2. The first stage 71 includes a first fixed focal length lens 73 and the first image sensor 12, and the second stage 2 includes the second (zoom) lens 4 and second image sensor 14. The focusing is carried out between the focus adjustments of the first and second image capture stages 71 and 2.

Because the focal length of the fixed focal length lens typically generates an ultra-wide angle field of view, e.g., 22 mm equiv., it may have a fixed focus set to a distance near the lens hyperfocal distance of, e.g., 8 feet, so that objects from 4 feet to infinity are in focus. Therefore, the fixed focal length lens does not need to include a focus adjustment. The fixed focal length lens includes an adjustable aperture and shutter assembly (not shown) to control the exposure of the image sensor.

FIG. 13 depicts a block diagram of a digital camera having a first image capture stage 71, a second image capture stage 2, and a third image capture stage 74. The first stage 71 includes a first fixed focal length lens 73 with a first image sensor 12, the second stage 2 includes a second (zoom) lens 4 with a second image sensor 14, and the third image capture stage 74 includes a third (zoom) lens 75 with a third image sensor 16. According to this configuration, the first lens 73 is typically a ultra-wide angle lens, the second (zoom) lens 4 is typically a wide angle zoom lens, and the third (zoom) lens 75 is typically a telephoto zoom lens. Since, as mentioned in the preceding paragraph, the first fixed focal length lens 73, being an ultra-wide angle lens, is typically not focused, the focusing is carried out between the second and third image capture stages 2 and 74.

Figure 14:
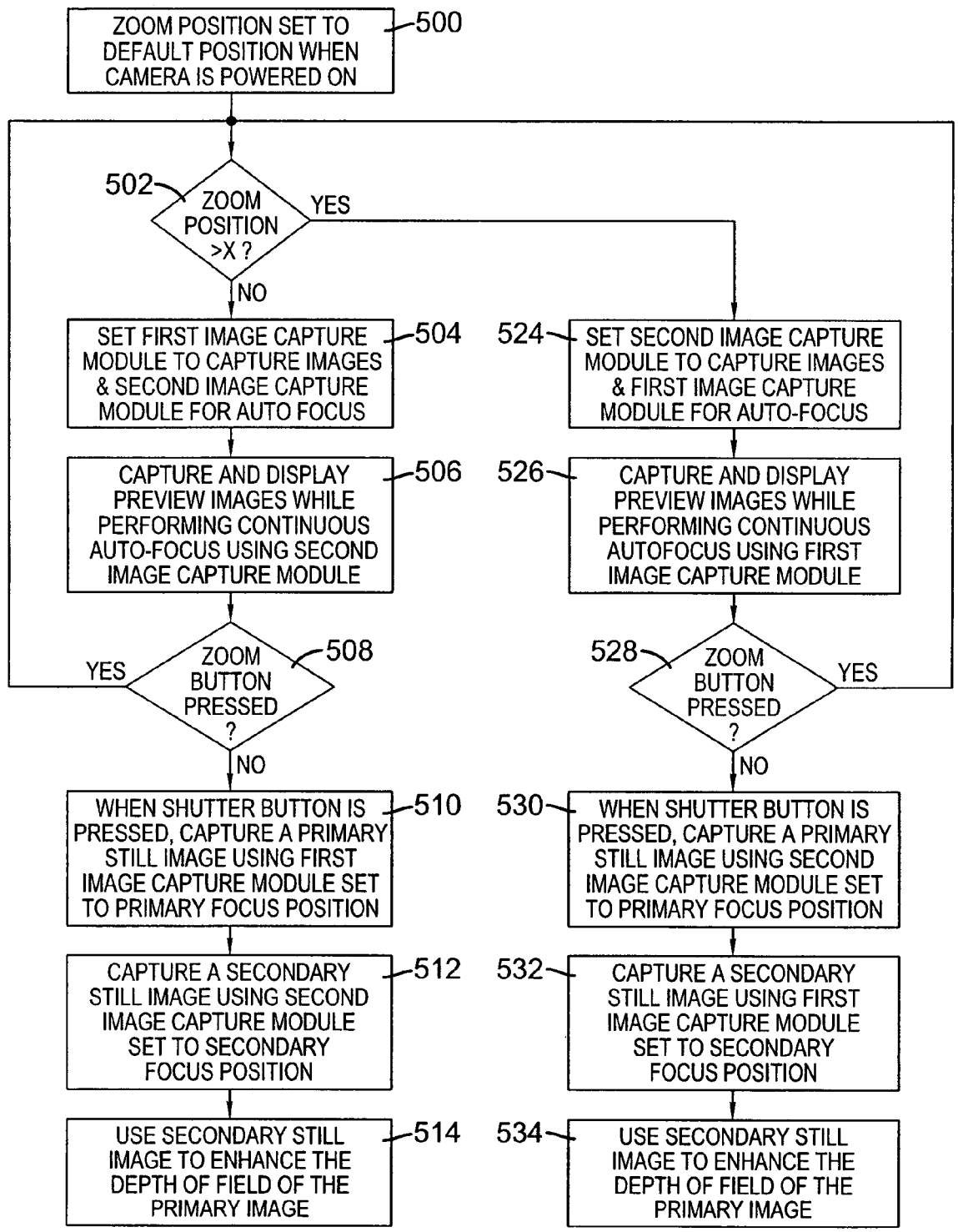
FIG. 14 depicts a flow diagram showing a method for enhancing the depth of field of an image by using images from both image capture stages according to an embodiment of the invention.

FIG. 14 depicts a flow diagram showing a method for enhancing the depth of field of an image by using images from both image capture stages from FIG. 1, in accordance with the present invention. In block 500 of FIG. 14, the zoom position is set to a default position when the camera is powered on. In block 502, the zoom position setting is compared to a value X at which the image capture function switches from the first image capture stage to the second image capture stage. In block 504, if the zoom position setting is less than X (a negative response to block 502), then the first image capture stage 1 is used to capture images in the preview mode, while the second image capture stage 2 is used to capture autofocus images. The first image capture stage 1 continues to capture images for preview on the display 70 (block 506) while the second image capture stage 2 is used to capture autofocus images for autofocus of the first image capture stage 1, which are processed by the image processor 50 and used to focus the first image capture stage 1. Should the zoom button not be pressed (negative response to block 508), and when the shutter button 42a is pressed, a primary still image is captured in block 510 using the first image capture stage set to a primary focus position. Then, in block 512, a secondary still image is captured using the second image capture stage set to a secondary focus position. Then, in block 514, the secondary still image is used to enhance the depth of field of the primary image, for instance, where the secondary still image is used to provide an enhancement signal that can be used to sharpen portions of the primary still image that are positioned near the secondary focus distance.

In block 524, if the zoom position setting is greater than X (a positive response to block 502), then the second image capture stage 2 is used to capture images in the preview mode, while the first image capture stage 1 is used to capture autofocus images. The second image capture stage 2 continues to capture images for preview on the display 70 (block 526) while the first image capture stage 1 is used to capture autofocus images for autofocus of the second image capture stage 2, which are processed by the image processor 50 and used to focus the second image capture stage 2. Should the zoom button be pressed (positive response to block 528), and when the shutter button 42a is pressed, a primary still image is captured in block 530 using the second image capture stage set to a primary focus position. Then, in block 532, a secondary still image is captured using the first image capture stage set to a secondary focus position. Then, in block 534, the secondary still image is used to enhance the depth of field of the primary image, for instance, where the secondary still image is used to sharpen portions of the primary still image that are positioned near the secondary focus distance.

As shown above, the enhancement signal is generated by the camera to sharpen portions of the primary still image that are positioned near the secondary focus distance. However, the primary and secondary still images may submitted to an external processor, such as the host PC 66 illustrated in FIG.

1, and the enhancement signal is generated by the external processor to sharpen portions of the primary still image that are positioned near the secondary focus distance.

Figure 15B:
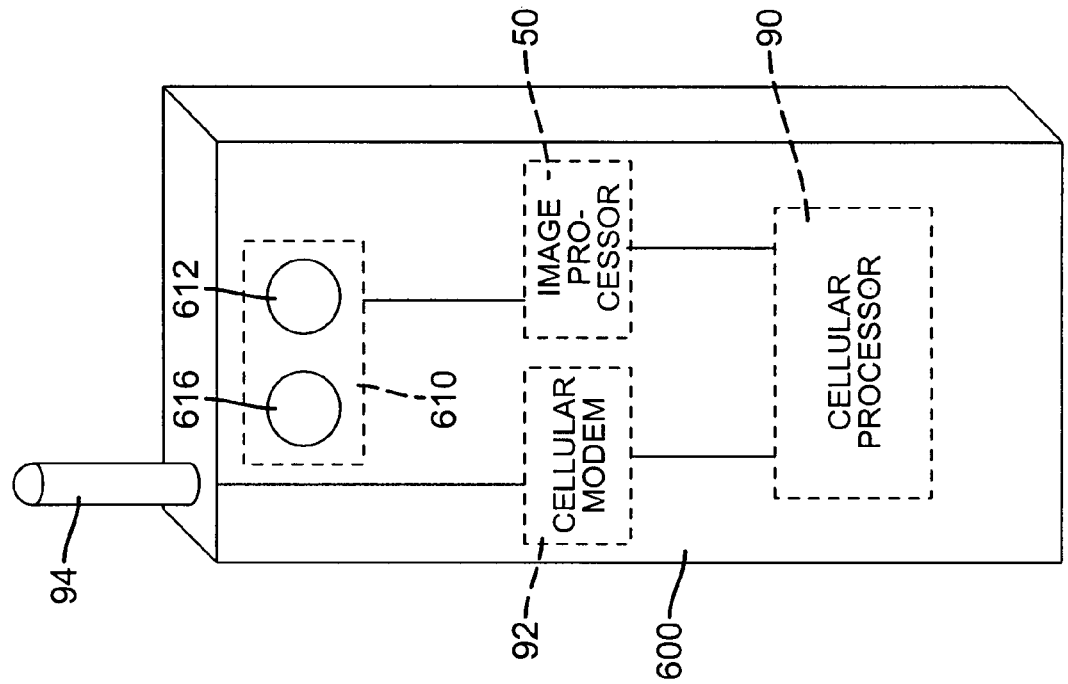
FIG. 15A and FIG. 15B depict a diagram of a mobile phone camera with two image capture stages according to another embodiment of the digital camera.
Figure 15A:
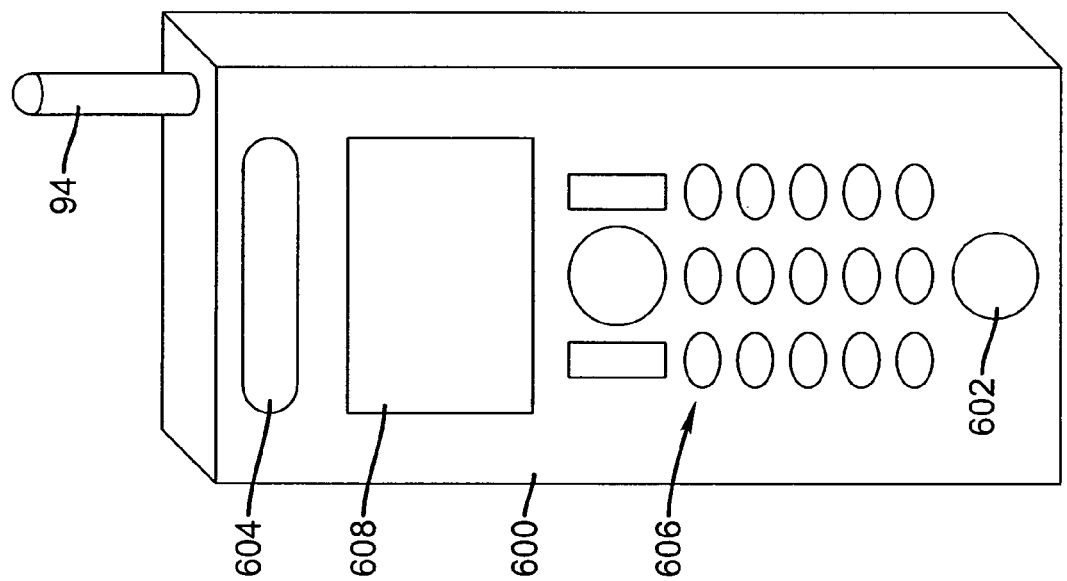

The concept of multiple lenses and multiple sensors, and the use of an integrated image capture assembly, may be adapted for use in a cell phone of the type having a picture taking capability. Accordingly, and as shown in FIG. 15A, a cell phone 600 includes a phone stage comprising a microphone 602 for capturing the voice of a caller, related electronics (not shown) for processing the voice signals of the caller and the person called, and a speaker 604 for reproducing the voice of the one called. A keypad 606 is provided for entering phone numbers and image capture commands, and a (LCD) display 608 for showing phone-related data and for reproducing images captured by the phone or received over the cellular network. The rear view of the cell phone 600 shown in FIG. 15B identifies some of the internal components, including a cellular image capture assembly 610 connected via the image processor 50 (as shown in FIG. 1) to a cellular processing stage comprising the cellular processor 90 and the modem 92. The cellular processor 90 receives and processes the image data from the image processor 50 and the voice data captured by the microphone 602, and transfers the image and voice data to the cellular modem 92. The cellular modem 92 converts the digital image and voice data into the appropriate format for transmission by the antenna 94 to a cellular network.

As the cellular image capture assembly 610 is shown in FIGS. 16A and 16B, where FIG. 16A is a top view of the assembly 610 taken along the lines 24B-24B in FIG. 16B, the assembly 610 comprises an integrated packaging of the optical and imaging components on a common substrate 620. More specifically, the assembly 610 includes a first fixed focal length lens 612 and a first image sensor 614, and a second fixed focal length lens 616 and a second image sensor 618. The first lens 612, preferably a fixed focal length wide angle lens (such as a 40 mm equiv. lens), forms an image on the first image sensor 614, and the second lens 616, preferably a fixed focal length telephoto lens (such as 100 mm equiv. lens), forms an image on the second image sensor 618. Both of the lenses are oriented in the same direction in order to form images of the same portion of the overall scene in front of them, albeit with different fields of view.

Each lens 612 and 616 and each associated image sensor 614 and 618 are mounted to the substrate 620 with an IR cut filter 622 in between to reduce the incidence of IR radiation on the image pixels. Electronic components 624, such as resistors, capacitors and power management components, are also mounted on the substrate 620. The image signals are taken from the substrate 620 via a flex connector 626. The data taken from the assembly 610 may be raw image data, or if suitable processors (not shown) are on board the substrate 620, the data could be YUV image data or JPEG image data. Moreover, the image processor 50 may provide digital zooming between the wide angle and the telephoto focal lengths; the user may initiate such zooming via a user interface displayed on the (LCD) display 608 and by keying appropriate buttons on the keypad 606. Furthermore, the wide angle image sensor 614 may have high resolution, e.g., higher than that of the telephoto image sensor 618, in order to provide a higher quality source image for the digital zooming.

In an embodiment according to the present invention, where both lenses 612 and 616 are adjustable focus lenses, the image processor 50 either (a) selects the sensor output from the wide angle lens 612 as the captured image signal and uses the sensor output from the telephoto lens 616 to generate a focus detection signal for the wide angle lens 612 or (b) selects the sensor output from the telephoto lens 616 as the captured image signal and uses the sensor output from the wide angle lens 612 to generate the focus detection signal for the telephoto lens 616. The focus detection signal is then applied to the autofocus subsystem 628 of the telephoto lens 616 in order to adjust the focus of the image providing the sensor output for the captured image signal. In this embodiment, the wide angle lens 612 could instead be a zoom lens, such as a wide angle to normal angle zoom lens.

In another embodiment, the wide angle lens 612 is set to its hyperfocal distance, which means it is in focus from a few feet to infinity without need for any focus adjustment by the user. The telephoto lens 616 is automatically focused by an auto focus subsystem 628. This is required because the hyperfocal distance increases as the focal length increases, and so the focus needs to be adjusted in order to obtain proper focus for objects at typical (e.g. 4' to 12') distances. By using only one focusing subsystem 628 for the telephoto lens 616, the cost and size can be reduced.

An important constraint in this embodiment is the "z" dimension 630, which must be held to a very small figure consistent with a cell phone layout and architecture. This may be obtained by careful choice of the telephoto focal length and the size of the sensor. For example, the size of the sensor 616, and consequently the size of the image that must be produced to fill the sensor, may be made small enough to reduce the focal length to an acceptable z dimension 630.

In a further embodiment, the two lenses may have approximately identical focal lengths, with the imaging arrays being of different sizes. With the differently sized imaging arrays, each lens is designed to fill the area of the imaging array and each lens-array combination will have substantially the same actual focal length, i.e., the same lens to array distance. However, the 35 mm equiv. of each lens will be different; consequently, each lens will have a different field of view.

While not shown in detail in FIGS. 16A and 16B, but similarly as was explained in connection with FIG. 1, an analog output signal from the first image sensor 614 is amplified by a first analog signal processor and provided to a first input of a control element, e.g., an analog multiplexer control element provided as one of the electronic components 624 on the substrate 620. The analog output signal from the second image sensor 618 is amplified by a second analog signal processor and provided to a second input of the control element. The function of the control element is to select either the first sensor output from the first image sensor 614 or the second sensor output from the second image sensor 618, depending on user input from the keypad 606 as to zoom selection, thereby providing a selected sensor output from the cellular image capture assembly 600 to the image processor 50.

Figure 18:
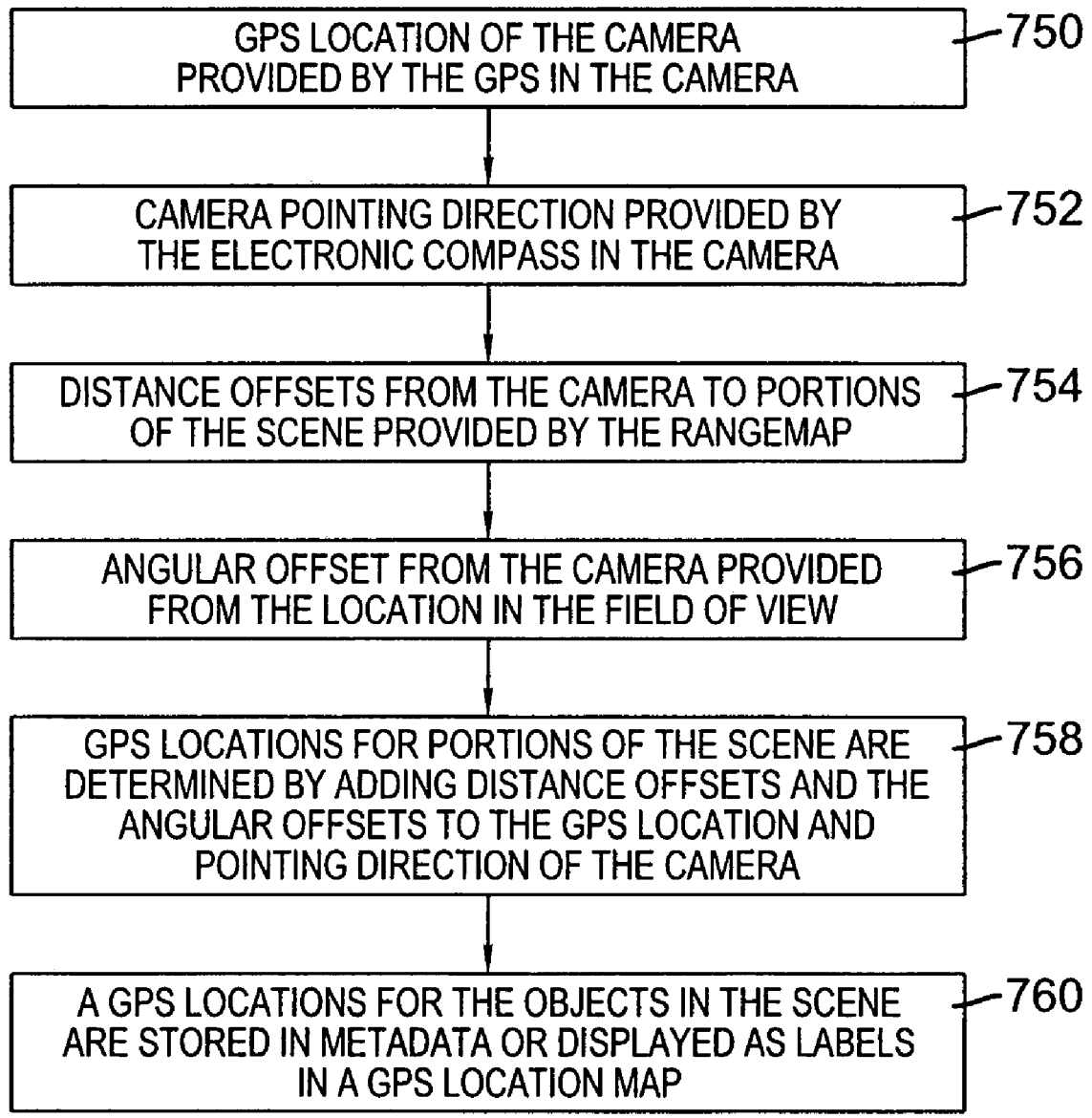
FIG. 18 depicts a flow diagram of a method for determining GPS locations of portions of the scene.

In a further embodiment using the range map (generated according to FIG. 11), the GPS location and the pointing direction of the camera, which is provided by the GPS unit 57 and the electronic compass 59 in the camera, are combined with distances and directions from the camera to portions of the scene to determine the GPS locations for portions of the scene. FIG. 18 depicts a flow chart for a method to determine GPS locations for portions of the scene. In block 750, the GPS location of the camera is determined by the GPS unit 57 in the camera. The pointing direction of the camera is determined in block 752 by the electronic compass 59 in the camera. Distance offsets from the camera to portions of the scene are provided by the range map, which is obtained in block 754 from a procedure such as depicted in FIG. 11. Angular offsets from the pointing direction of the camera (provided by the electronic compass 59) are determined in block 756 from the location of a portion of the scene in the field of view in the image. GPS locations for portions of the scene are determined in block 758 by adding the distance offsets and the angular offsets to the GPS location and pointing direction of the camera. The GPS locations for portions of the scene are then stored in block 760 in the metadata for the image or displayed as labels on the image in the form of a GPS location map. Alternately, the GPS location for a portion of the image can be displayed on the electronic camera.

Those skilled in the art will recognize that GPS locations of portions of the scene can be used for a variety of purposes, including without limitation: determining the identity of an object; providing navigational directions to a location in a scene; identifying the field of view of a camera relative to a map or other geographical database, etc.

Figure 19:
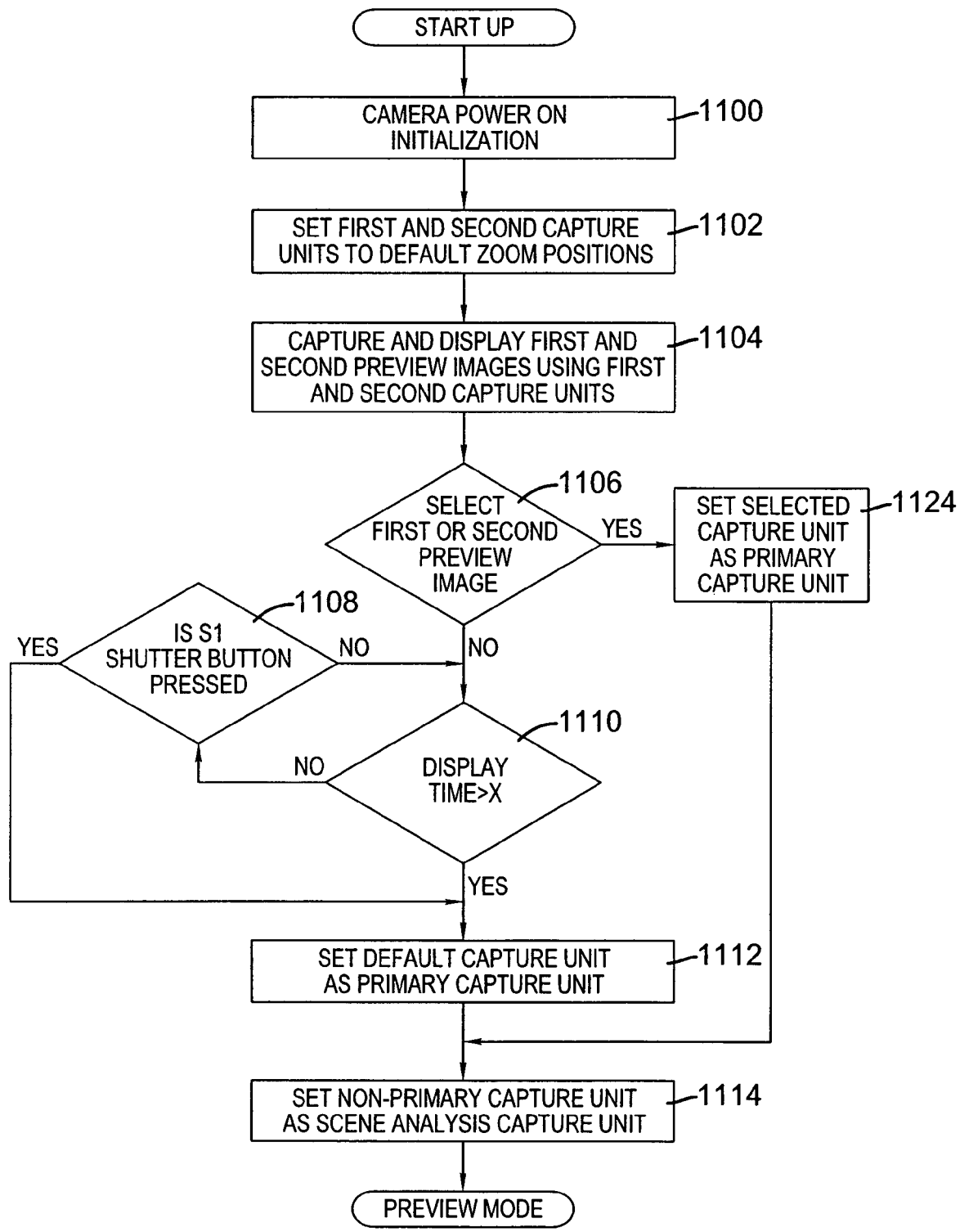
FIG. 19 depicts a flow diagram for selecting one of the imaging stages in a dual lens camera system as the primary capture unit, while relegating the other imaging stage to other functions, such as scene analysis, according to another embodiment of the invention.
Figure 20:
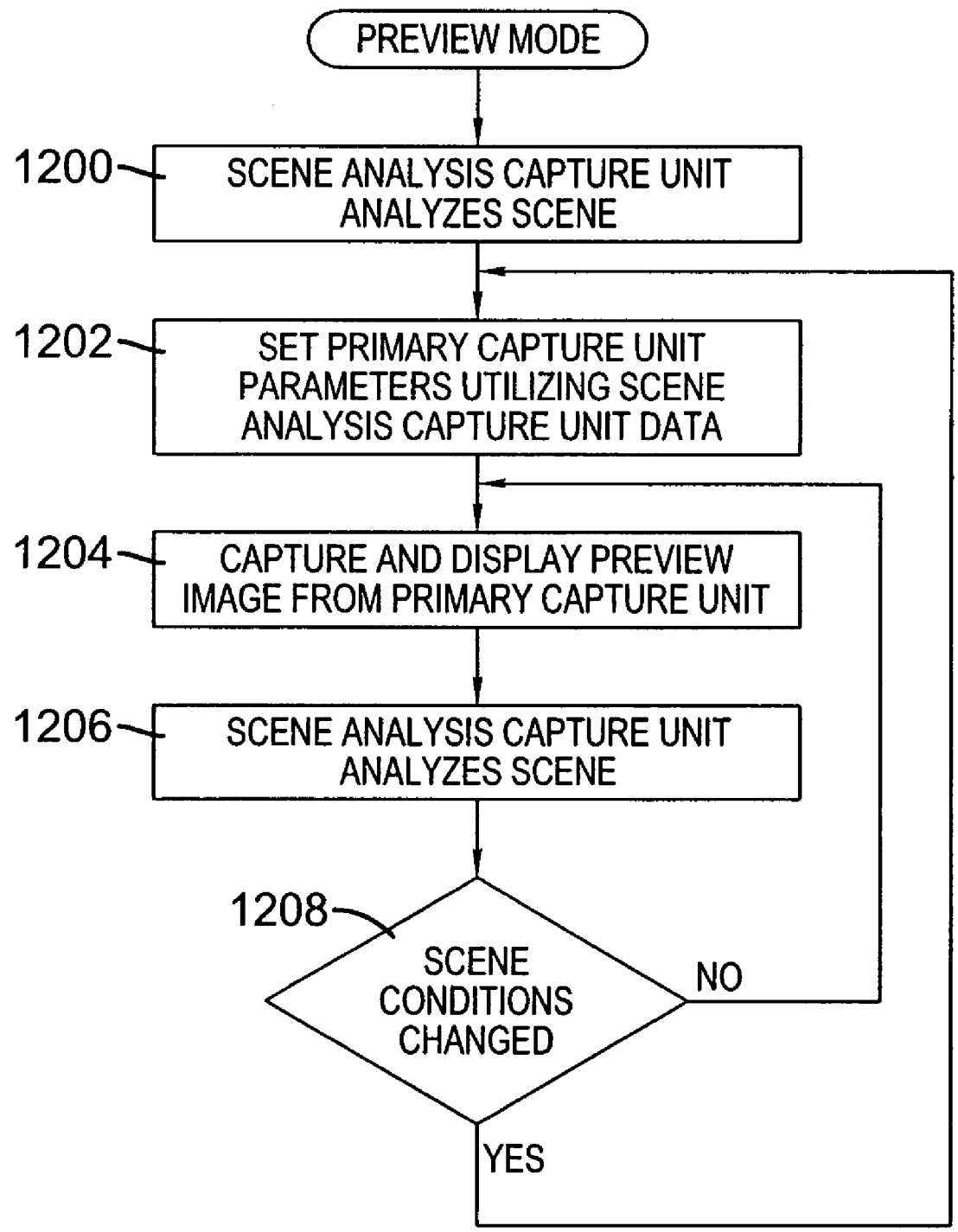
FIG. 20 depicts a flow diagram illustrating the usage of the non-primary capture unit for scene analysis, according to another embodiment of the invention.

FIG. 19 depicts a flow diagram illustrating a process for selecting one of the imaging stages in a dual lens camera system as the primary capture unit, while relegating the other imaging stage to certain other functions, such as scene analysis, according to the present invention. More specifically, the power to the camera is turned on and the initialization process begins (block 1100). After the initialization process is completed, the first and second imaging stages 1 and 2 are set to their default zoom positions (block 1102), which are predetermined initial zoom positions that determine the images that are initially captured and displayed. Thereupon, the first and second imaging stages capture and display first and second preview images (block 1104) on the image display 70. These images could be displayed in several ways, for instance, side by side on the display as thumbnails or the like, one within the other, sequentially, etc. Next, the camera operator is asked to decide whether the first or second preview image should be the primary image (block 1106), where the primary image will be the one that is captured and stored. The operator is given a display time interval x in which to make this decision (block 1110). If the shutter button is pressed during this interval (block 1108), or if the operator fails to make a decision during this interval (yes to block 1110), a predetermined one of the imaging stages (the default imaging stage) is automatically set to be the primary capture unit (block 1112). (The default imaging stage could be pre-selected for a variety of reasons, one being to provide a comprehensive, wider angle view of the scene as the initial image.) Otherwise, if the operator picks one of the stages (yes to block 1106), the selected imaging stage is set to be the primary capture unit (block 1124). For either situation, the other (non-selected) imaging stage is designated as the scene analysis capture unit (block 1114). Thereupon, the primary capture unit is operated in the preview mode, as subsequently explained in connection with FIGS. 20-22.

FIGS. 20-22 and 24-26 depict flow diagrams illustrating the usage or analysis of the image from one imaging stage in a dual (or more) lens camera system to modify the image produced by another imaging stage according to the present invention, that is, to influence, analyze, augment or otherwise change the image produced by the other imaging stage. For instance, in FIG. 20, once the primary capture unit is put in the preview mode (as shown in FIG. 19), the scene analysis capture unit analyzes the scene (block 1200) and the image processor 50 sets the primary capture unit parameters utilizing the scene analysis data obtained by the scene analysis capture unit (block 1202). Such scene analysis data could include without limitation exposure data, dynamic range data, depth of field data, color balance, identification of different aspects of the scene including faces, grass, sunset, snow, etc, and the capture unit parameters could include without limitation aperture value, exposure time, focus position, white balance, ISO setting, etc. The preview image is then captured by the primary capture unit and displayed on the display 70 (block 1204). The scene analysis capture unit then continues to analyze the scene (block 1206), and if the scene conditions have not changed (no to block 1208) the process loops back to block 1204 and a preview image is again captured by the primary capture unit and displayed on the display 70 (without changing the capture parameters). If the scene conditions have changed (yes to block 1208), the process loops back to block 1202 and the image processor 50 resets the primary capture unit parameters utilizing the scene analysis data obtained by the scene analysis capture unit, and the subsequent process is repeated as before.

Figure 21:
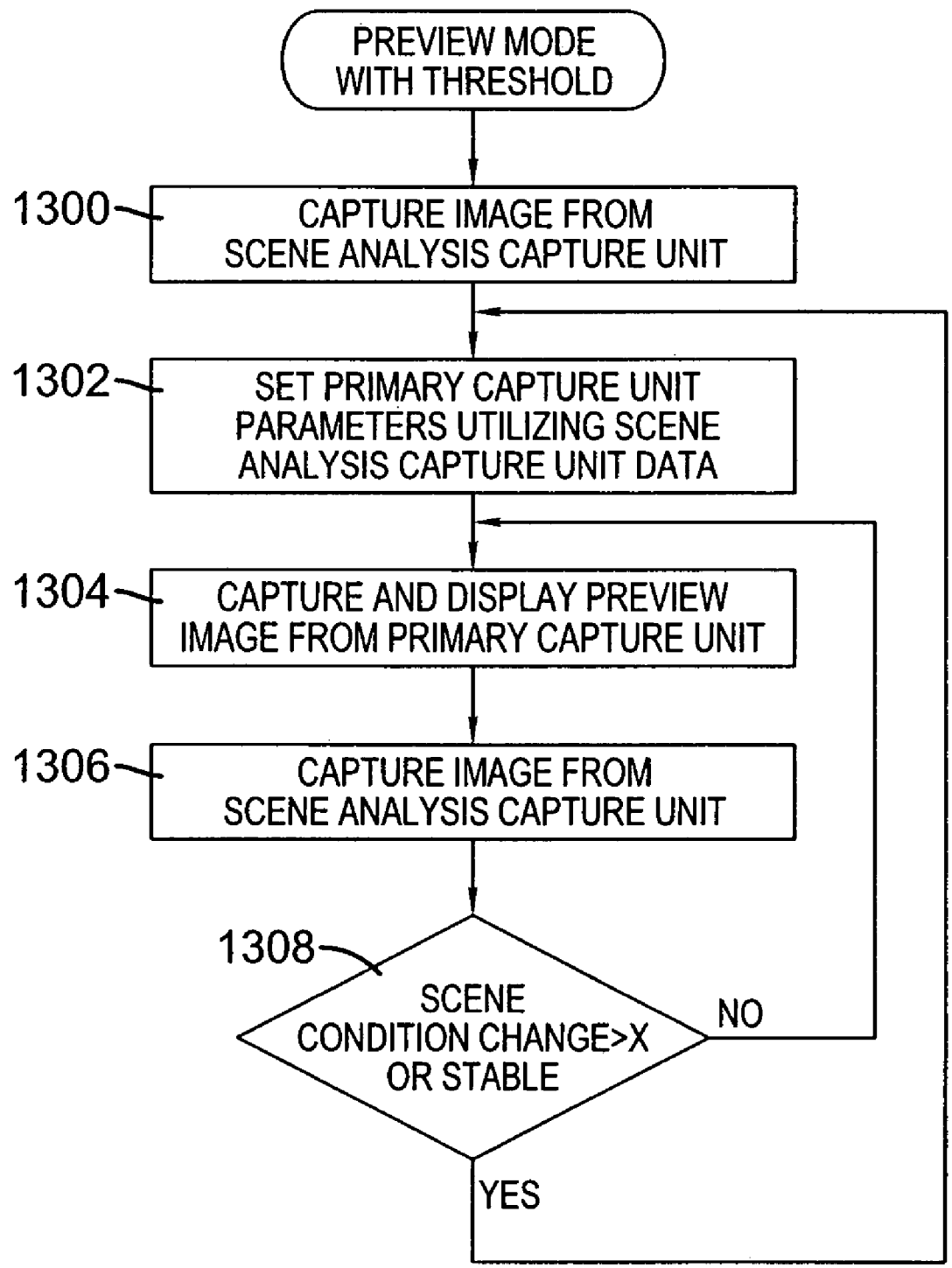
FIG. 21 depicts a flow diagram illustrating the usage of the non-primary capture unit for scene analysis whenever the change in scene conditions exceeds a threshold, according to another embodiment of the invention.

In FIG. 21, the primary capture unit parameters are only changed if the change in scene conditions exceed a threshold value x. Thus, in utilizing the preview mode with a threshold, the scene analysis capture unit captures an image and analyzes the scene (block 1300). Then, the image processor 50 sets the primary capture unit parameters utilizing the scene analysis data obtained by the scene analysis capture unit (block 1302). A preview image is then captured by the primary capture unit and displayed on the display 70 (block 1304). Then, another image is captured from the scene analysis capture unit (block 1306). If the scene conditions of this later image fail to change by a threshold equal to x (no to block 1308), that is, the scene conditions are considered to be stable from image to image, the process loops back to block 1304 and another preview image is captured by the primary capture unit and displayed on the display 70 (without changing the capture parameters). Then, another image is captured from the scene analysis capture unit (block 1306). Otherwise, when the scene condition change is greater than the threshold x and the situation is considered to be unstable (yes to block 1308), the process loops back to block 1302 and the image processor 50 resets the primary capture unit parameters utilizing the scene analysis data obtained by the scene analysis capture unit. Then, the process is repeated as before.

Figure 22:
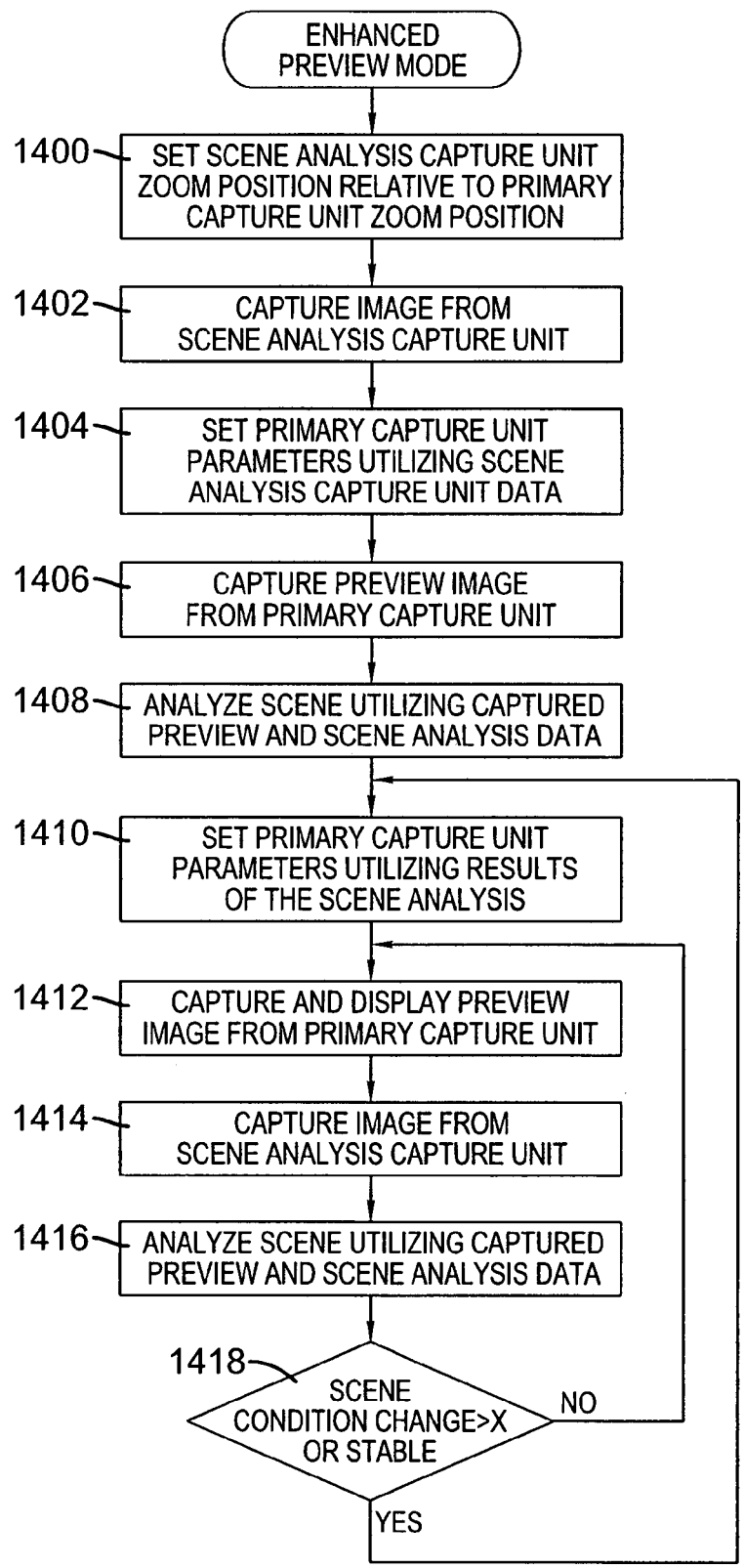
FIG. 22 depicts a flow diagram illustrating the usage of both the primary capture unit and the non-primary capture unit for scene analysis, according to another embodiment of the invention.

In FIG. 22, the consideration of the threshold scene conditions is enhanced by considering the relative zoom positions of the capture units and utilizing scene information from the images captured by both of the capture units. In utilizing this enhanced preview mode, the zoom position of the scene analysis capture unit is set relative to the zoom position of the primary capture unit (block 1400). Then, the scene analysis capture unit captures an image (block 1402) and the image processor 50 sets the primary capture unit parameters utilizing the scene analysis data obtained by the scene analysis capture unit (block 1404). A preview image is then captured by the primary capture unit (block 1406) and the scene is analyzed utilizing the captured preview image and the scene analysis data (block 1408). Then, the image processor 50 sets the primary capture unit parameters utilizing the results of the preceding scene analysis (block 1410), that is, results obtained by analyzing images from both capture units. Next, the preview image is captured by the primary capture unit and displayed on the display 70 (block 1412) and another image is captured from the scene analysis capture unit (block 1414). The scene is then analyzed by utilizing the captured preview image data and the scene analysis data (block 1416). If the scene conditions fail to change by a threshold equal to x (no to block 1418), that is, the scene conditions are considered to be stable, the process loops back to block 1412 and another preview image and scene analysis image are captured by the primary capture unit and the scene analysis capture unit, respectively (blocks 1412 and 1414) and the aforementioned process continues. Otherwise, where the scene condition change is greater than the threshold (yes to block 1400) and the situation is considered to be unstable, the process loops back to block 1410 and the image processor 50 resets the primary capture unit parameters utilizing the results of new scene analysis data (obtained by the scene analysis capture unit in block 1416), and the process is repeated.

Figure 23:
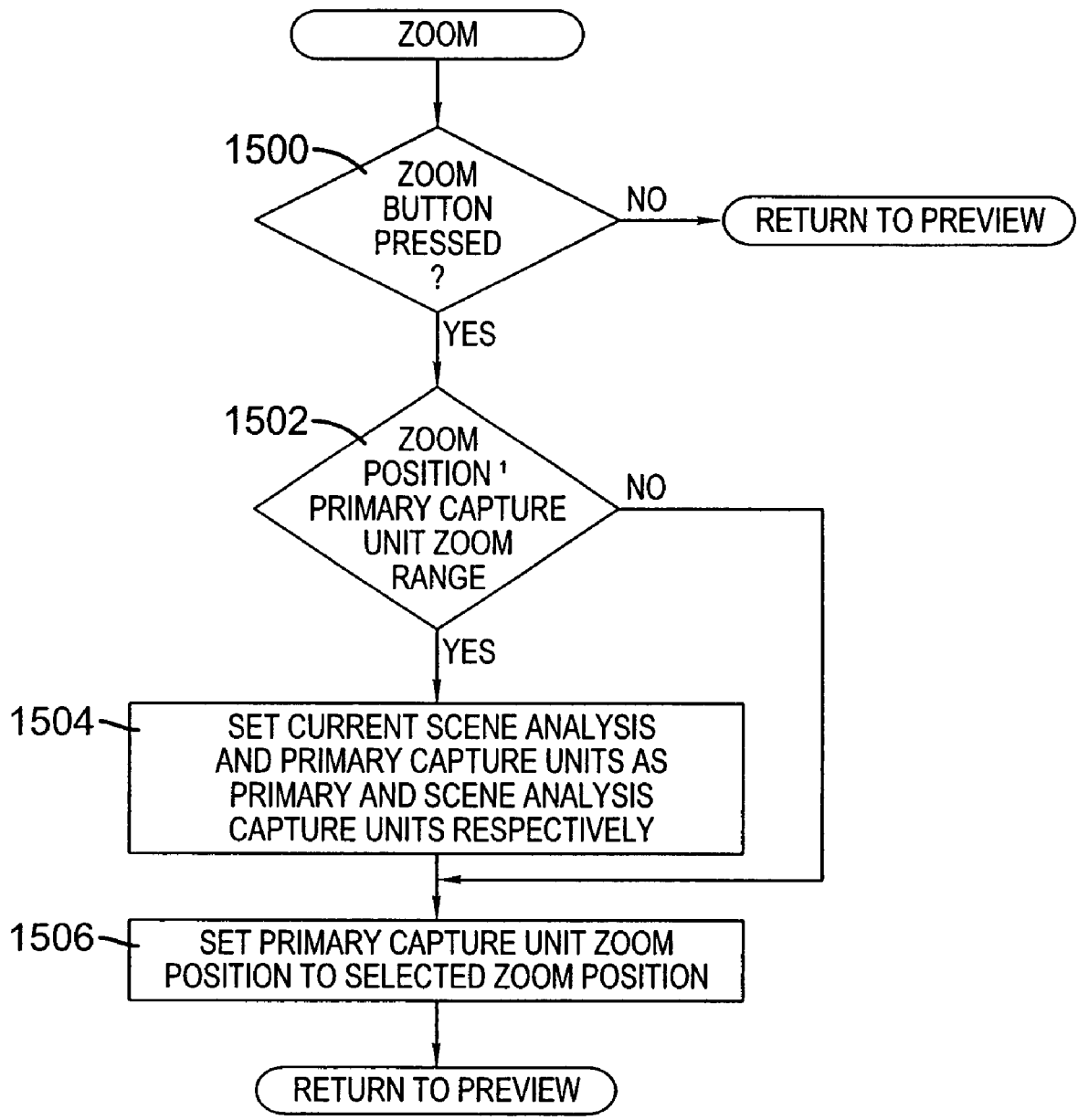
FIG. 23 depicts a flow diagram illustrating the reversal of the functions of the capture units, that is, the current scene analysis and primary capture units are reset to be the primary capture unit and scene analysis capture unit, respectively, according to another embodiment of the invention.

During the operations shown in the preceding FIGS. 19-22, the preview process is continued as shown unless either the shutter button 42a or the zoom button 42c is pressed. As shown in FIG. 23, if the zoom button 42c is pressed (block 1500), and if the requested zoom position is not within the zoom range of the primary capture unit (yes to block 1502), the functions of the capture units are reversed, that is, the current scene analysis and primary capture units are reset to be the primary capture unit and scene analysis capture unit, respectively. Then, the zoom position of the primary capture unit is set to the selected zoom position (block 1506) and the process returns to the preview mode, as illustrated by FIGS. 20-23. However, if the zoom button 42c is pressed (yes to block 1500), and if the requested zoom position is within the zoom range of the primary capture unit (no to block 1502), the functions of the respective capture units are maintained the same as before and the zoom position of the primary capture unit is set to the selected zoom position (block 1506), and the process returns to the preview mode.

Figure 24:
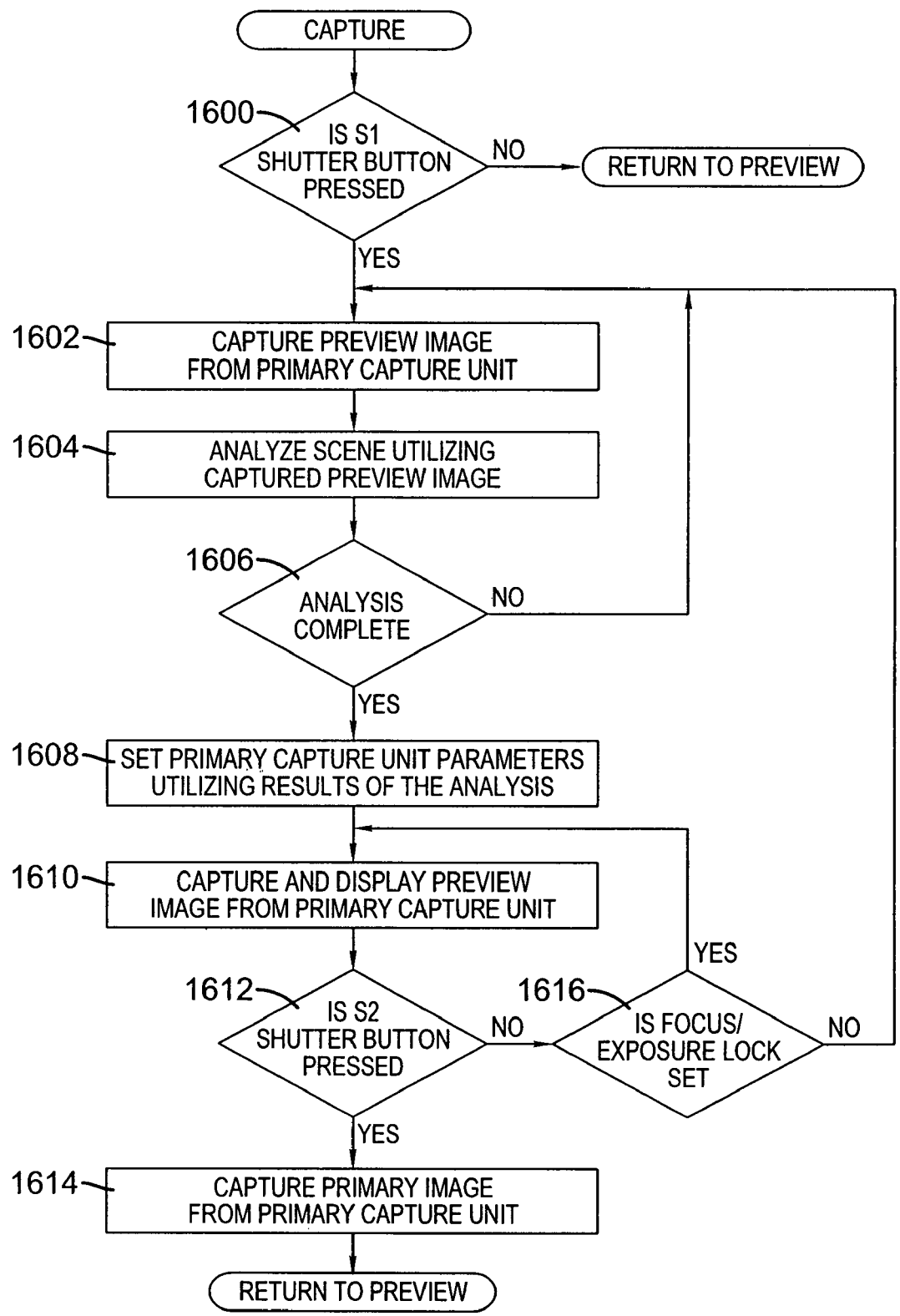
FIG. 24 depicts a flow diagram illustrating the usage of a preview image taken by the primary capture stage to set the capture unit parameters for the primary capture stage, specifically during the capture process, according to another embodiment of the invention.
Figure 25:
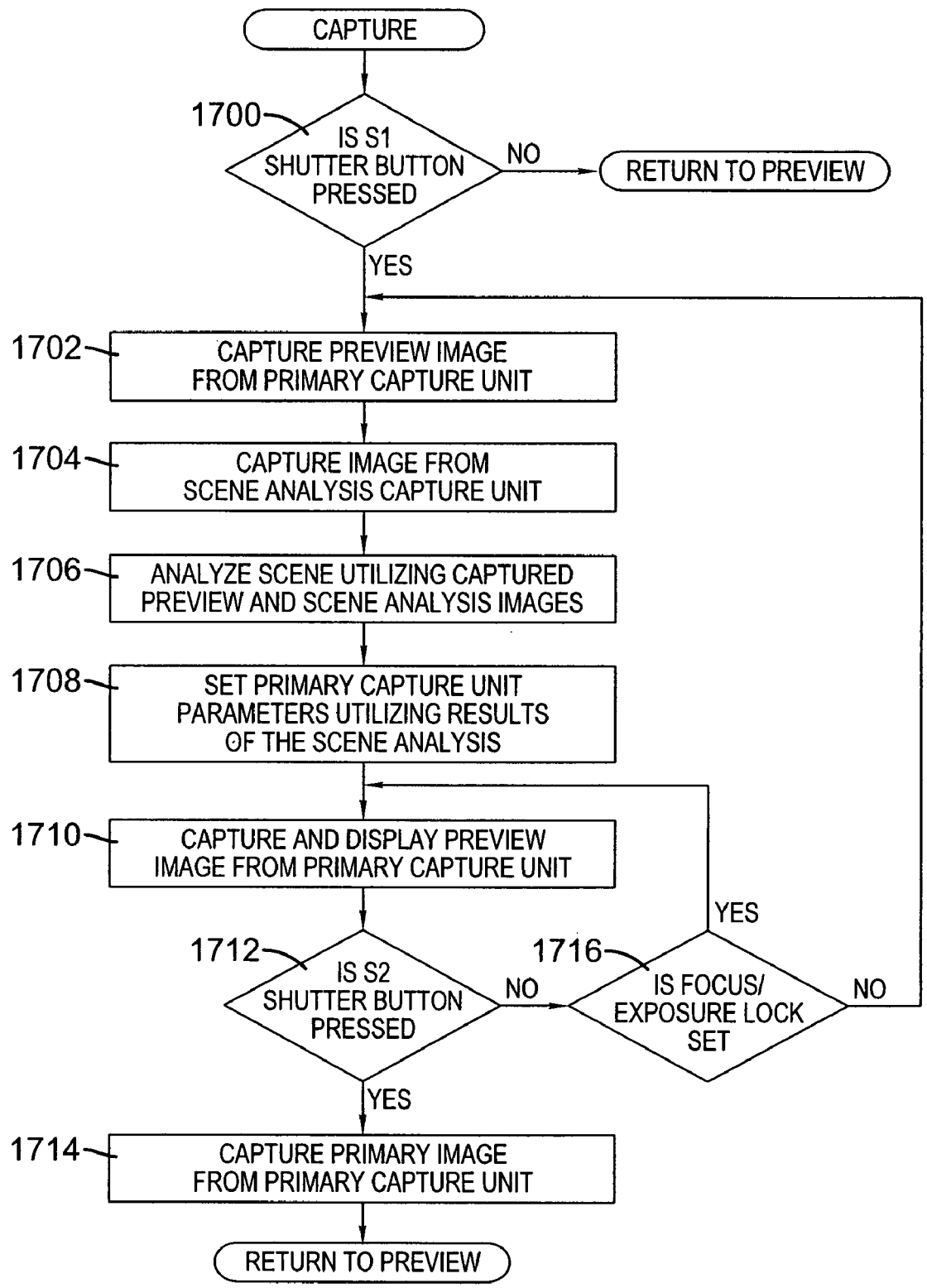
FIG. 25 depicts a flow diagram illustrating the usage of a preview image taken by the primary capture stage and a scene analysis image taken by the non-capture stage to set the capture unit parameters for the primary capture stage, specifically during the capture process, according to another embodiment of the invention.
Figure 26:
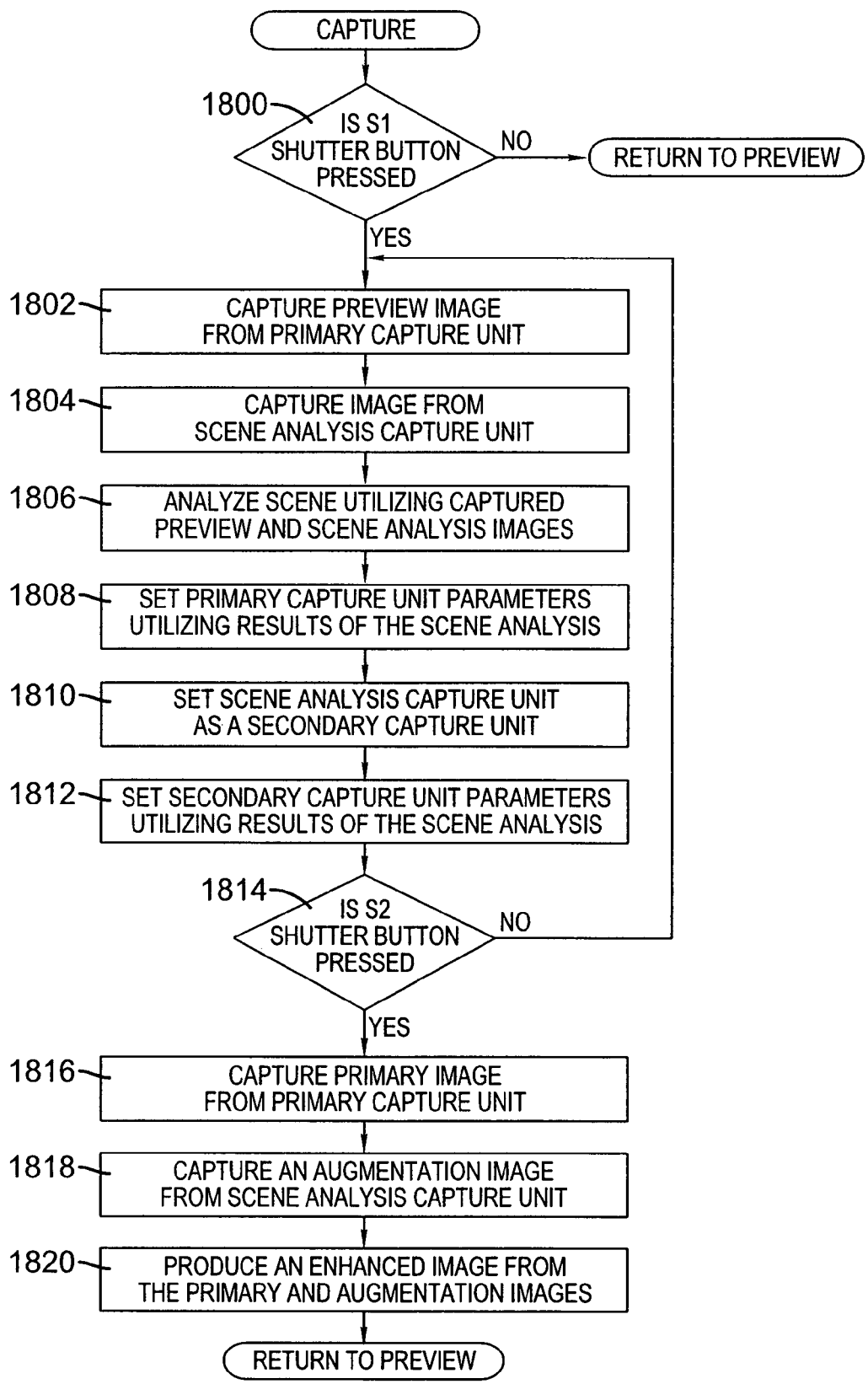
FIG. 26 depicts a flow diagram illustrating the usage of a primary image taken by the primary capture stage and an augmentation image taken by the non-capture stage to produce an enhanced image, according to another embodiment of the invention.
Figure 27:
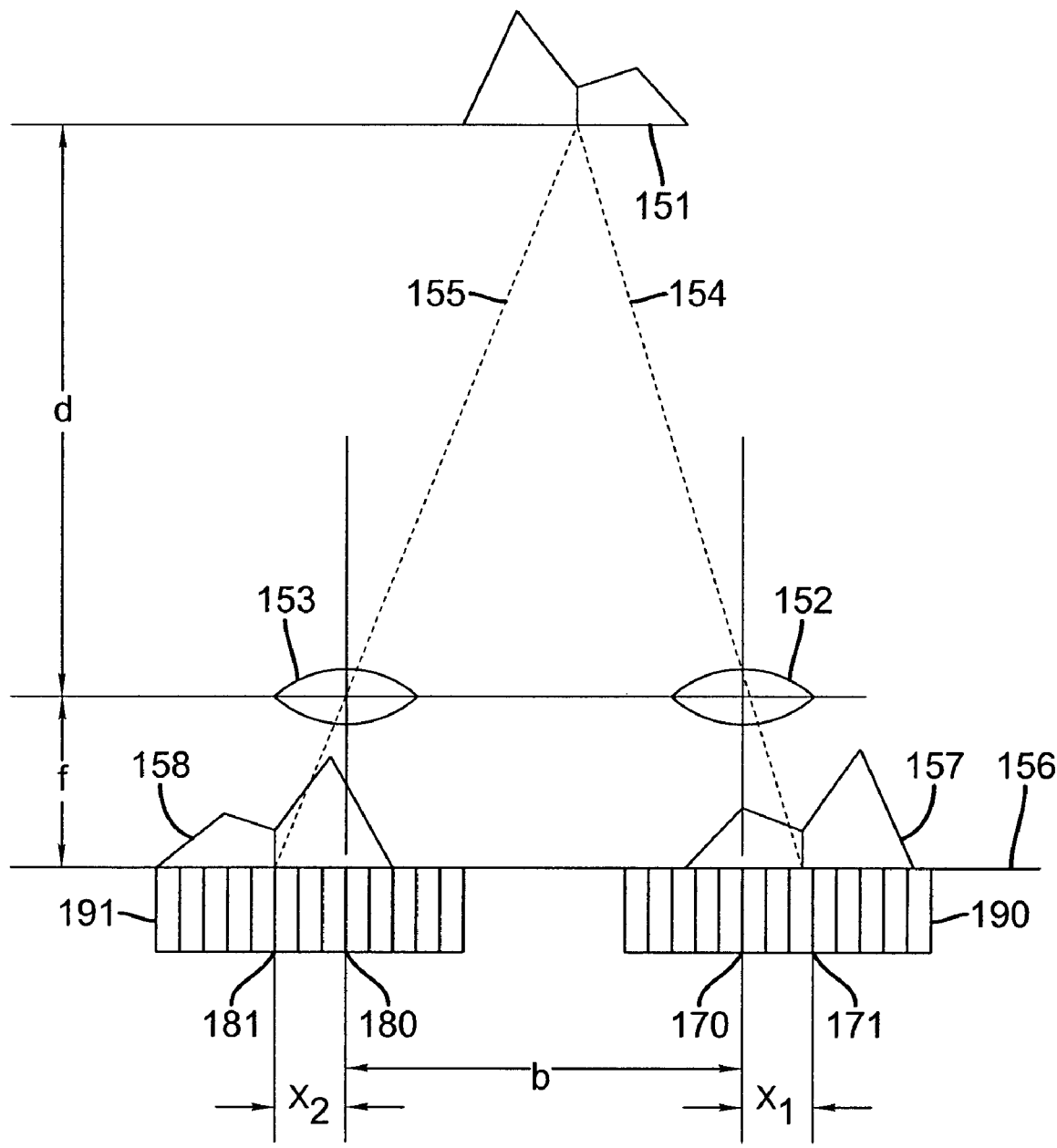
FIG. 27 depicts a diagram illustrative of the operation of a conventional dual lens rangefinder.
Figure 28:
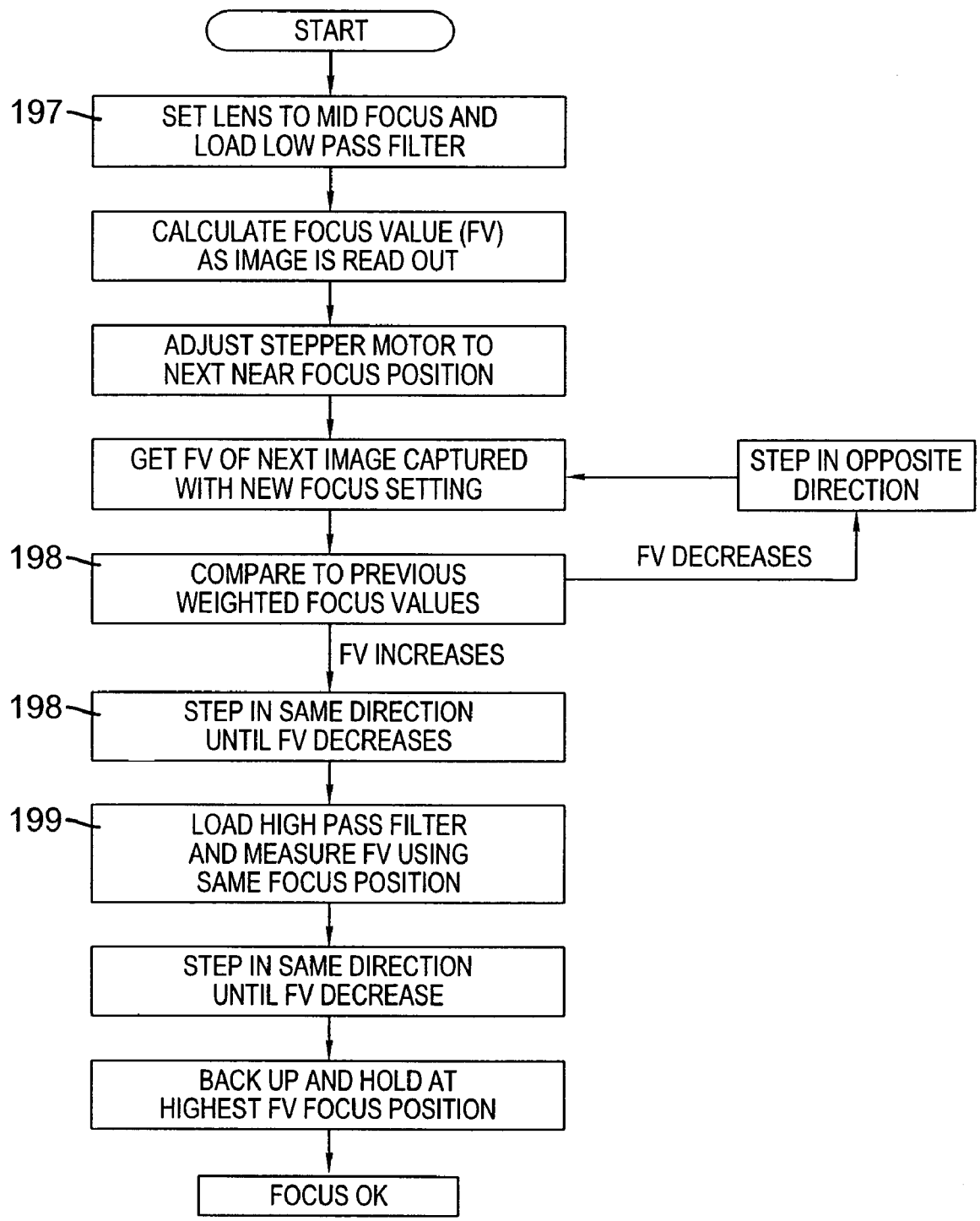
FIG. 28 depicts a flow diagram of a conventional "hill climbing" contrast autofocus algorithm.
Figure 29:
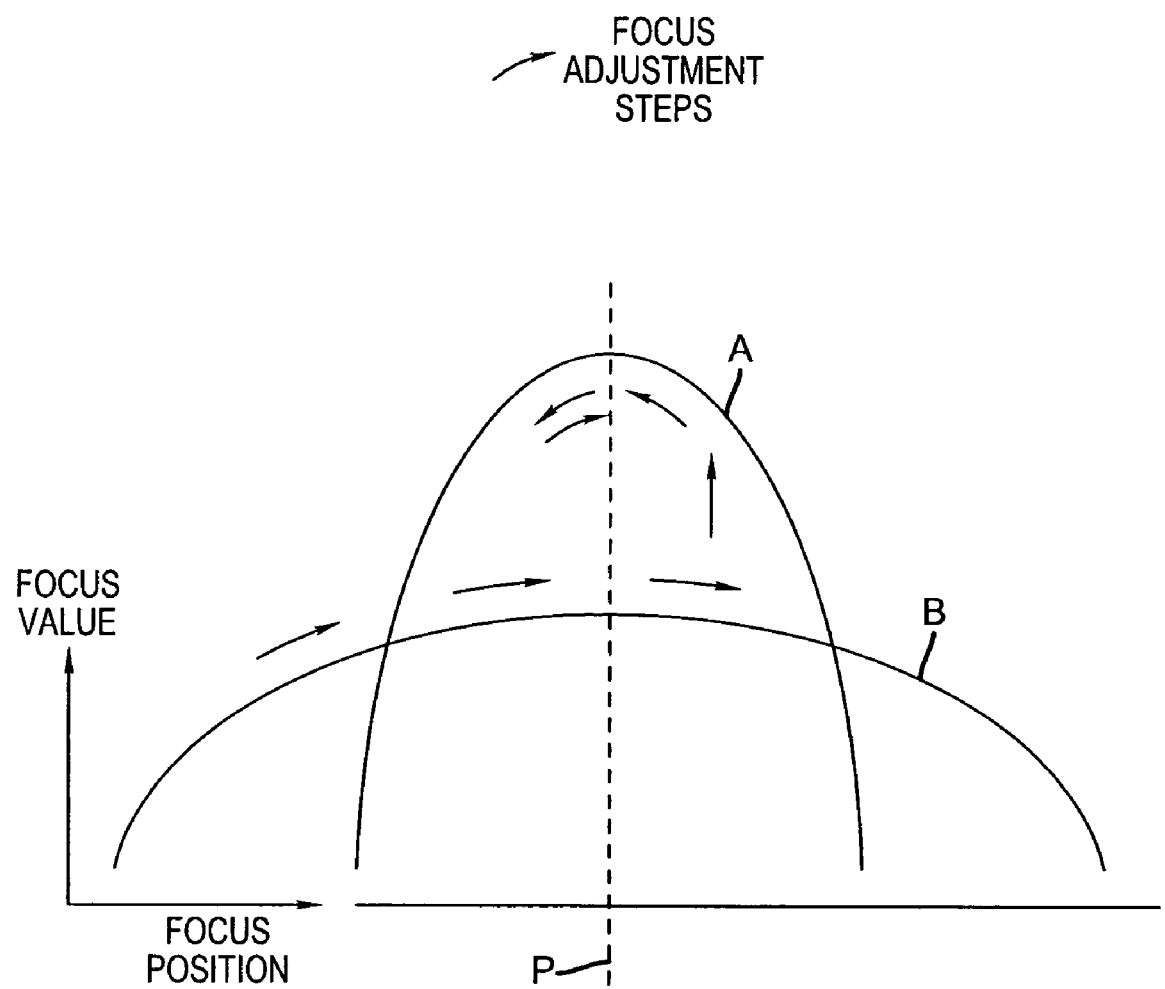
FIG. 29 illustrates the relationship between the focus value obtained from the filters used to isolate components of the image and the lens position for a "hill climbing" autofocus method.

FIGS. 24-26 depict flow diagrams illustrating the usage or analysis of the image from one imaging stage in a dual (or more) lens camera system to modify the image produced by another imaging stage according to the present invention, that is, to influence, analyze, augment or otherwise change the image produced by the other imaging stage, specifically during the capture process. Referring to FIG. 24, to enter the capture mode (block 1600) according to a first capture embodiment, the shutter button 42a is pressed half-way (S1)—otherwise, the process returns to the preview mode. In the capture mode, a preview image is captured from the primary capture unit (block 1602). The scene is next analyzed utilizing the captured preview image (block 1604). When the analysis is complete (yes to block 1606), the image processor 50 sets the primary capture unit parameters utilizing the results of the scene analysis (block 1608). Then, using the set parameters, a preview image is captured and displayed from the primary capture unit (block 1610). When the shutter button 42a is fully pressed (S2) so as to initiate image capture (yes to block 1612), a primary image is captured from the primary capture unit using the set parameters (block 1614), and the process returns to the preview mode. If the shutter button 42a was not fully depressed (no to block 1612), the camera checks to see if the focus or exposure lock is set (block 1616). If it is (yes to block 1616), the process loops back to block 1610 and another preview image is captured and displayed from the primary capture unit, the condition of the shutter button 42a is again checked (block 1612), and the process continues as before. If the focus or exposure lock is not set (no to block 1616), the process loops back to the block 1602 and a preview image is captured from the primary capture unit and the scene is analyzed utilizing the captured preview image (block 1604). Then, the process continues as before.

Referring to FIG. 25, to enter the capture mode (block 1700) according to a second capture embodiment, the shutter button 42a is pressed (S1) half-way. Then, a preview image is captured from the primary capture unit (block 1702). Next, an image is captured by the scene analysis capture unit (block 1704), and the scene is analyzed utilizing both the captured preview image and the captured scene analysis image (block 1706). The image processor 50 next sets the primary capture unit parameters utilizing the results of the combined scene analysis (block 1708). Then, using the set parameters, a preview image is captured and displayed from the primary capture unit (block 1710). Next, and as shown before in FIG. 24, when the shutter button 42a is fully (S2) pressed (yes to block 1712), a primary image is captured from the primary capture unit using the set parameters (block 1714), and the process returns to the preview mode. If the shutter button 42a was not fully depressed, the camera checks to see if the focus or exposure lock is set (block 1716). If it is, the process loops back to block 1710 and another preview image is captured and displayed from the primary capture unit (block 1710), the condition of the shutter button 42a is checked (block 1712), and the process continues as before. If the focus or exposure lock is not set (no to block 1716), the process loops back to block 1702, and a preview image is captured from the primary capture unit (block 1702) and the scene is analyzed utilizing the captured preview image (block 1704). Then, the process continues as before.

Referring to FIG. 26, to enter the capture mode according to a third capture embodiment, the shutter button 42a is pressed (S1) half-way (block 1800). Then, a preview image is captured from the primary capture unit (block 1802) and an image is captured from the scene analysis capture unit (block 1804). The scene is next analyzed utilizing both the captured preview image and the captured scene analysis image (block 1806), and the image processor 50 sets the primary capture unit parameters utilizing the results of the combined scene analysis (block 1808). The scene analysis capture unit is next designated as a secondary capture unit (block 1810), and the image processor 50 sets the secondary capture unit parameters utilizing the results of the combined scene analysis (block 1812). Next, when the shutter button 42a is fully (S2) pressed (yes to block 1814), a primary image is captured from the primary capture unit using the set parameters (block 1816) and an augmentation image is captured from the scene analysis capture unit (block 1818), which is now designated the secondary capture unit. Then an enhanced image is produced by the image processor 50 from the primary and augmentation images (block 1820), and the process returns to the preview mode. If the shutter button 42a was not fully pressed (block 1814), the process loops back to block 1802 and the process is resumed by again capturing images from the primary capture unit and the scene analysis capture unit (blocks 1802 and 1804).

In accordance with the invention, different types of augmentation or modification are contemplated in relation to FIG. 26. In a first type of augmentation or modification, and as was depicted in connection with FIG. 14, an image is captured from the primary capture unit at one focus position and another image is captured from the scene analysis capture unit (the secondary image capture unit) at another focus position. Then, the two images are combined into a modified image with a broadened depth of field. The advantage is that this can be done without having to stop down the aperture of the primary lens to obtain the greater depth of field, which is particularly useful for low light capture where a large aperture is preferred.

In another type of augmentation or modification according to the present invention, the image could be examined by the image processor 50 for its dynamic range. When the dynamic range exceeds a predetermined threshold, the scene analysis capture unit is used to produce a secondary image with different dynamic range than the primary image. For example, the primary image could be captured at a normal exposure, while the secondary image could be captured at more of an extreme exposure, i.e., either under- or over-exposed. Then, if for example, highlights are blown out in the primary exposure, the secondary exposure could be underexposed to capture detail in the highlights. Alternatively, if shadows are darkened in the primary exposure, the secondary exposure could be overexposed to capture detail in the shadows. Then, a modified image is created with a broadened dynamic range by replacing portions of the primary image with portions of the secondary image.

It should be understood that the images captured by the primary and secondary capture units could be a still image or a video image, and in the case of a video image could be a series of images. In either case, the still image or the series of images constituting the video signal may be modified in accordance with the particular form of augmentation described, according to the present invention. For instance, an electronic camera incorporating the capture units may produce a video image signal and the secondary output image is used to modify at least, e.g., the depth of field and/or the dynamic range of the series of images constituting the video image signal.

The flow diagram shown in FIG. 14 can be modified to obtain a primary image that is enhanced specifically for dynamic range according to the present invention. For instance, referring to FIG. 14, when the shutter button 42a is pressed, a primary still image is captured (similar to blocks 510 or 530) using the first (or second) image capture stage set to a primary exposure level. Then, (similar to blocks 512 or 532) a secondary still image is captured using the second (or first image) capture stage set to a secondary exposure level. Then, (similar to blocks 514 or 534) the secondary still image is used to enhance the dynamic range of the primary image, for instance, where the secondary exposure, which is underexposed to capture detail in the highlights, is combined with the primary image to obtain an extended dynamic range primary image.

In a preferred method for producing the modified image, a sliding scale is used to create the modified image in which the pixel values are determined by considering the pixel values of both the primary and secondary images, as described in commonly-assigned, copending U.S. patent application Ser. No. 11/460,364 (which was filed Jul. 27, 2006 in the names of John Border and Efrain Morales, and entitled "Producing an Extended Dynamic Range Digital Image"), which is incorporated herein by reference. It should be noted that having two exposure levels is to enable a correction for dynamic range is particularly important when using a flash, wherein overexposure conditions are often produced. Consequently, the exposure time of one of the capture stages will be set to a very short exposure or the timing of the exposure will be shifted to be either just before the flash or just after the flash.

The augmentation process can also be applied in connection with image pairs having different resolutions. For instance, in commonly-assigned, copending U.S. patent application Ser. No. 11/461,574 (which was filed Aug. 1, 2006 in the names of John Border, Scott Cahall and John Griffith, and entitled "Producing Digital Image with Different Resolution Portions"), which is incorporated herein by reference, a first wide angle digital image of a scene and a second telephoto digital image of a portion of substantially the same scene are captured by two capture stages. A composite image is then formed by combining a portion of the first wide angle digital image and a portion of the telephoto digital image, to produce a digital image with improved resolution during digital zooming. More specifically, digital zooming of the composite image produces a zoomed image with high resolution throughout the zoom range with improved image quality.

In a further embodiment of the invention, the primary capture stage and secondary capture stage are set for different exposure times so that different levels of noise and motion blur are present in the respective images. For example: the primary capture stage is set for a relatively long exposure so that the digital noise in the image is low, but any motion present either from movement of the camera or from movement of objects in the scene results in motion blur. Simultaneously, the secondary capture stage is set for a relatively fast exposure so that digital noise in the image is higher, but the motion blur is less. The primary image and the secondary image are then compared to one another to identify motion blur. The gain of the secondary image is increased so the average pixel values in the secondary image match those of the primary image. A modified image is then created by replacing portions of the primary image with portions of the secondary image. In effect, portions of the primary image (areas of lower noise but with some motion blur) are replaced with corresponding portions of the secondary image (areas of higher noise but little or no motion blur) to obtain a modified image with relatively low noise and good sharpness.

The invention has been described in detail with particular reference to certain preferred embodiments thereof, but it will be understood that variations and modifications can be effected within the spirit and scope of the invention.

PARTS LIST 1 first imaging stage
2 second imaging stage
3 first zoom lens
4 second zoom lens
5a zoom and focus motors
5b zoom and focus motors
10A digital camera
12 first image sensor
12e first sensor output
13 clock drivers
14 second image sensor
14e second image output
15 clock drivers
16 third image sensor
17 clock drivers
22 first analog signal processor (ASP1) & A/D converter
24 second analog signal processor (ASP2) & A/D converter
25 third analog signal processor (ASP2) & A/D converter
34 first digital multiplexer control element
36 second digital multiplexer control element
37 third digital multiplexer control element
38 DRAM buffer memory
40 control processor and timing generator
42 user controls
42a shutter button
42c zoom button
42d multi-position selector
46 automatic exposure detector
48 electronic flash
50 image processor
52 memory card interface
54 removable memory card
56 RAM memory
57 GPS unit
58 firmware memory
59 electronic compass
62 host interface
64 interconnection
66 host PC 70 color LCD image display
71 first image capture stage
73 first fixed focal length lens
74 third image capture stage
75 third (zoom) lens
90 cellular processor
92 cellular modem
94 antenna
100 zoom lens setting block
101 input zoom position block
102 zoom position check block
104 capture stage setting block
106 second stage autofocus image capture block
108 first stage focus block
110 first stage preview capture and display block
112 zoom button check block
114 capture button check block
116 first stage capture block
118 first stage video capture block
119 focus quality check block
120 refocus check block
124 capture stage setting block
126 first stage autofocus image capture block
128 second stage focus block
130 second stage preview capture and display block
132 zoom button check block
134 capture button check block
136 second stage capture block
138 second stage video capture block
139 focus quality check block
140 refocus check block
151 object
152 first lens
153 second lens
154 first path
155 second path
156 focal plane
157 first image
158 second image
170 first reference position
171 first shifted position
180 second reference position
181 second shifted position
190 first sensor array
191 second sensor array
197 low frequency bandpass filter loading stage
198 comparison stage
199 high frequency bandpass filter loading stage
250 zoom position selection block
252 image capture stage determination block
254 non-capture stage zoom block
256 hyperfocal setting block
258 initiate autofocus sequence block
260 capture autofocus images block
262 crop and upsample block
264 image correlation block
266 best focus determination block
268 focus lens movement block
270 capture image block
272 "hill climb" autofocus block
274 capture button actuation block
276 capture video block
278 continuous "hill climb" focus check block
280 focus check block
282 best focus determination block
284 focus lens movement block
286 capture stage refocus block
300 image sets capture block
302 crop and upsample block
304 correlate images block
306 autofocus rangefinder calibration curve generation block
350 representation of an autofocus image
352 representation of a zoomed and cropped autofocus image
400 image sets capture block
402 position vs. distance comparison block
404 autofocus "hill climb" calibration curve generation block
440 lower focal length capture block
442 crop and upsample lower focal length image block
444 correlate images block
446 determine focus correction block
448 longer focal length capture block
460 first stage "hill climb" first image capture block
462 first stage preview image block
464 refocus first stage block
466 second stage "hill climb" second image capture block
468 second stage another image capture block
470 second stage focus conditions comparison block
472 focus change check block
480 correlate images block, determining pixel offsets
482 pixel offset conversion block, using rangefinder calibration curve
484 range map production block
500 default zoom position block
502 zoom position check block
504 capture stage setting block
506 second stage preview capture, display and autofocus block
508 zoom button check block
510 first stage primary image capture at primary focus block
512 second stage secondary image capture at secondary focus block
514 primary image enhancement block, using secondary image
524 capture stage setting block
526 first stage preview capture, display and autofocus block
528 zoom button check block
530 second stage primary image capture at primary focus block
532 first stage secondary image capture at secondary focus block
534 primary image enhancement block, using secondary image
600 cell phone
602 microphone
604 speaker
606 keypad
608 (LCD) display
610 cellular image capture assembly
612 first fixed focal length lens
614 first image sensor
616 second fixed focal length lens
618 second image sensor
620 substrate
622 IR cut filter
624 electronic components
626 flex connector
628 auto focus subsystem
630 z dimension
750 camera GPS location block
752 camera pointing direction block
754 distance offsets block
756 angular offsets block
758 scene GPS locations block
760 GPS location storage block 1100 power on block
1102 default setting block
1104 capture and display block
1106 preview selection block
1108 shutter check block
1110 display time check block
1112 set default capture unit block
1114 set scene analysis capture unit block
1124 set selected primary capture unit block
1200 scene analysis block
1202 set capture parameters block
1204 capture and display preview image block
1206 scene analysis block
1208 scene condition check block
1300 capture scene analysis image block
1302 set capture parameters block
1304 capture and display preview image block
1306 scene analysis block
1308 scene condition threshold check block
1400 zoom position setting block
1402 capture scene analysis image block
1404 set capture parameters block
1406 capture preview image block
1408 scene analysis block, using preview and scene analysis data
1410 set primary capture parameters block
1412 capture and display preview image block
1414 capture scene analysis image block
1416 scene analysis block, using preview and scene analysis data
1418 scene condition threshold check block
1500 zoom button check block
1502 zoom position check block
1504 reverse capture unit assignment block
1506 set primary capture unit zoom position block
1600 shutter button check block
1602 capture preview image block
1604 scene analysis using preview image block
1606 analysis complete check block
1608 set primary capture parameters block
1610 capture and display preview image block
1612 shutter button check block
1614 capture primary image block
1616 focus/exposure lock check block
1700 shutter button check block
1702 capture preview image block
1704 capture scene analysis image block
1706 scene analysis using preview and scene image block
1708 set primary capture parameters block
1710 capture and display preview image block
1712 shutter button check block
1714 capture primary image block7
1716 focus/exposure lock check block
1800 shutter button check block
1802 capture preview image block
1804 capture scene analysis image block
1806 scene analysis using preview and scene image block
1808 set primary capture parameters block
1810 set scene analysis capture unit as secondary capture unit block
1812 set secondary capture parameters block
1814 shutter button check block
1816 capture primary image block
1818 capture augmentation image block
1820 produce enhanced image block

What is claimed is:

1. An electronic camera for producing an output image of a scene from a captured image signal, said electronic camera comprising:
   a first imaging stage comprising a first lens for capturing a first image of the scene on a first image sensor;
   a second imaging stage comprising a second lens for capturing second image of the scene on a second image sensor;
   a processing stage for analyzing the first and second images to determine one or more capture parameters; and
   wherein the first imaging stage utilizes a first setting of at least one of the capture parameters to capture a third image and the second imaging stage utilizes a second, different setting of said at least one of the capture parameters to capture a fourth image substantially simultaneously with the third image, and wherein the processor produces an augmented image from at least a portion of both the third and fourth images.

2. The electronic camera as claimed in claim 1 wherein at least a portion of the augmented image is sharpened.

3. The electronic camera as claimed in claim 2 wherein at least a portion of the augmented image has an extended depth of field.

4. The electronic camera as claimed in claim 2 wherein the augmented image includes sharpened and blurred portions.

5. The electronic camera as claimed in claim 1 wherein the third image is captured with a different focus setting than the fourth image.

6. The electronic camera as claimed in claim 1 wherein the secondary output image is used by the processing stage to modify the dynamic range of the primary image.

7. The electronic camera as claimed in claim 1 wherein the secondary output image is captured by the second imaging stage at a different exposure level than used by the first imaging stage to capture the primary output image.

8. The electronic camera as claimed in claim 1 wherein the captured image signal is a still image signal and the secondary output image modifies at least one of the depth of field and the dynamic range of the still image signal.

9. The electronic camera as claimed in claim 1 wherein the captured image signal is a video image signal and the secondary output image modifies at least one of the depth of field and the dynamic range of the video image signal.

10. The electronic camera as claimed in claim 1 wherein the imaging stages are set for different exposure times so that different levels of noise and motion blur are present in the respective primary and secondary output images, whereby a modified primary image is then formed by replacing portions of the primary image with portions of the secondary image such that the level of motion blur is reduced while minimizing an increase in the noise level.

11. The electronic camera as claimed in claim 1 wherein the third image is captured with a different exposure level than the fourth image.

12. A method for operating a digital camera having first and second imaging stages for forming separate images of a scene, said method comprising the steps of:
   using the first imaging stage for capturing a first image;
   using the second imaging stage for capturing a second image;
   analyzing the first and second images to determine data indicative of capture conditions;
   capturing third and fourth images substantially simultaneously with the first and second imaging stages, respectively, by processing the data to determine capture parameters, wherein one of the stages uses a setting of at least one of the capture parameters that is different from the setting used by the other stage; and producing an augmented image from at least a portion of both the third and fourth images.

13. The method as claimed in claim 12 wherein at least a portion of the augmented image is sharpened.

14. The method as claimed in claim 13 wherein at least a portion of the augmented image has an extended depth of field.

15. The method as claimed in claim 13 wherein the augmented image includes sharpened and blurred portions.

16. The method as claimed in claim 12 wherein the third image, is captured with a different focus setting than the fourth image.

17. The method as claimed in claim 12 wherein the secondary output image is used to modify the dynamic range of the primary image.

18. The method as claimed in claim 12 wherein the secondary output image is captured by the second imaging stage at a different exposure level than used by the first imaging stage to capture the primary output image.

19. The method as claimed in claim 12 wherein the captured image signal is a still image signal and the secondary output image modifies at least one of the depth of field and the dynamic range of the still image signal.

20. The method as claimed in claim 12 wherein the captured image signal is a video image signal and the secondary output image modifies at least one of the depth of field and the dynamic range of the video image signal.

21. The electronic camera as claimed in claim 12 wherein the imaging stages are set for different exposure times so that different levels of noise and motion blur are present in the respective primary and secondary output images, whereby a modified primary image is then formed by replacing portions of the primary image with portions of the secondary image such that the level of motion blur is reduced while minimizing an increase in the noise level.

22. The method as claimed in claim 12 wherein the third image is captured with a different exposure level than the fourth image.

* * * * *